(12) United States Patent
Ishikawa

(10) Patent No.: US 6,909,851 B2
(45) Date of Patent: *Jun. 21, 2005

(54) DISPERSION COMPENSATION APPARATUS INCLUDING A FIXED DISPERSION COMPENSATOR FOR COARSE COMPENSATION AND A VARIABLE DISPERSION COMPENSATOR FOR FINE COMPENSATION

(75) Inventor: George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 367 days.

This patent is subject to a terminal disclaimer.

(21) Appl. No.: 09/950,709

(22) Filed: Sep. 13, 2001

(65) Prior Publication Data

US 2002/0003646 A1 Jan. 10, 2002

Related U.S. Application Data

(62) Division of application No. 09/021,578, filed on Feb. 10, 1998, now Pat. No. 6,320,687.

(30) Foreign Application Priority Data

Sep. 9, 1997 (JP) ............................. 9-243877

(51) Int. Cl.⁷ .......................... H04B 10/18; H04B 10/08
(52) U.S. Cl. ...................... 398/147; 398/159; 398/208; 398/148; 398/149
(58) Field of Search ................................ 359/161, 173, 359/195, 188; 398/147, 208, 212, 214, 148–150, 159, 81

(56) References Cited

U.S. PATENT DOCUMENTS

| 5,365,362 A | 11/1994 | Gnauck et al. ............. 359/174 |
| 5,411,566 A | 5/1995 | Poole et al. .................. 65/402 |
| 5,430,568 A | 7/1995 | Little et al. .................. 359/124 |
| 5,608,562 A | 3/1997 | Delavaux et al. ........... 359/161 |
| 5,877,879 A | 3/1999 | Naito .......................... 359/133 |
| 5,877,881 A | 3/1999 | Miyauchi et al. ........... 359/161 |
| 5,887,093 A | 3/1999 | Hansen et al. ................ 385/27 |
| 5,995,694 A | 11/1999 | Akasaka et al. ............. 385/123 |
| 6,320,687 B1 * | 11/2001 | Ishikawa ..................... 359/161 |

FOREIGN PATENT DOCUMENTS

| DE | 19602433 | 7/1997 |
| EP | 0700178 | * 3/1996 |
| JP | 6-216467 | 8/1994 |
| JP | 7-327012 | 12/1995 |
| JP | 08-256106 | 10/1996 |
| JP | 9-133825 | 5/1997 |
| JP | 9-218314 | 8/1997 |

OTHER PUBLICATIONS

Ohn, M.M., et al., "Tunable fiber grating dispersion using a piezoelectric stack," OFC '97 Technical Digest, WJ3, pp. 155–156.

Barcelos, S., et al., "Characteristics of chirped fiber grating for dispersion compensation," OFC '96 Technical Digest, WK12, pp. 161–162.

(Continued)

*Primary Examiner*—Leslie Pascal
(74) *Attorney, Agent, or Firm*—Staas & Halsey LLP

(57) ABSTRACT

An apparatus which compensates for dispersion in an optical transmission line. The apparatus includes a fixed dispersion compensator and a variable dispersion compensator. The fixed dispersion compensator has a fixed dispersion amount and coarsely compensates for the dispersion in the transmission line. The variable dispersion compensator has a variable dispersion amount and finely compensates for the dispersion in the transmission line. The fixed and variable dispersion compensators can be located at many positions. For example, one may be in a transmitter and the other may be in a receiver. Both may be in the transmitter and/or the receiver. One may be in either the transmitter or the receiver, with the other in an optical repeater positioned along the transmission line.

12 Claims, 28 Drawing Sheets

OTHER PUBLICATIONS

Takiguchi, K., et al., "Variable Group–Delay Dispersion Equalizer Using Lattice–Form Programmable Optical Filter on pLanar Lightwave Circuit," IEEE J. Selected Topics in Quantum Electronics, Jun. 2, 1996, pp. 270–276.

Sano, Akihide, et al., "Automatic dispersion equalization by monitoring extracted–clock power lever in a 40–Gbit/s, 200 km transmission line," ECOC '96, TuD.3.5, 1996, 99. 207–210.

* cited by examiner

DISPERSION COMPENSATION APPARATUS INCLUDING A FIXED DISPERSION COMPENSATOR FOR COARSE COMPENSATION AND A VARIABLE DISPERSION COMPENSATOR FOR FINE COMPENSATION

This application is a divisional of application Ser. No. 09/021,578, filed Feb. 10, 1998, now allowed U.S. Pat. No. 6,320,687.

CROSS-REFERENCE TO RELATED APPLICATIONS

This application is based on, and claims priority to, Japanese application No. 9-243877, filed Sep. 9, 1997, in Japan, and which is incorporated herein by reference.

BACKGROUND OF THE INVENTION

1. Field of the Invention

The present invention relates to an apparatus which compensates for dispersion in an optical fiber transmission line. More specifically, the present invention relates to an apparatus which includes a fixed dispersion compensator for coarse compensation and a variable dispersion compensator for fine compensation.

2. Description of the Related Art

Optical transmission systems using fiber optical transmission lines are being used to transmit relatively large amounts of information. For example, optical transmission systems at 10 Gb/s are now in practical use. However, as users require larger amounts of information to be rapidly transmitted, a further increase in the capacity of optical transmission systems is required.

However, in an optical transmission system, as transmission speed increases, the transmission distance is severely limited because of wavelength degradation caused by group-velocity dispersion (GVD) in an optical fiber. Furthermore, when the transmitting optical power is increased to maintain the required transmit/receive level difference, the effect of self-phase modulation (SPM), a fiber nonlinear effect, increases. This increase in SPM further complicates the waveform degradation through interaction with the group-velocity dispersion (SPM-GVD effect).

As an example, consider an optical transmission system having transmission lines which use single-mode fibers (SMFs) having a zero dispersion wavelength in the 1.3 $\mu$m region. This type of SMF is the most common type of fiber currently being used in existing fiber transmission lines. In such an optical transmission system, the chromatic dispersion value at a signal light wavelength of 1.55 $\mu$m (where transmission loss of silica-based fiber is the lowest) is as large as about +18 ps/nm/km. As a result, dispersion compensation techniques are required for 10 Gb/s and higher-speed transmission systems where a relatively small amount of dispersion can be tolerated.

For example, according to an experiment with a 40 Gb/s SMF transmission over a distance of 50 km (see G. Ishikawa et al., ECOC' 96 ThC.3.3 for the transmitter/receiver configuration), the dispersion compensation tolerance when the power penalty is 1 dB or less is extremely small, i.e., 30 ps/nm. Therefore, in a 40 Gb/s SMF transmission system, highly precise dispersion compensation must be performed for each repeater section in the system.

Transmission lines using 1.55 $\mu$m band dispersion-shifted fibers (DSFs) have been installed in recent years for long-distance transmission at 10 Gb/s. However, because of slight variations in fiber core diameter introduced when drawing fibers in the optical fiber manufacturing process, the zero dispersion wavelength $\lambda_0$ varies from one repeater section to another. Further, even within the same repeater section, $\lambda_0$ varies along the length of fiber. In addition, a transmission cable is usually constructed by joining together multi-core cable segments each a few kilometers long. That is, there is no continuity in $\lambda_0$ between adjacent segments, so $\lambda_0$ has a random distribution profile. As a result, a variation of ±10 nm can occur within one repeater section, and the state of the variation differs from one repeater section to another. Strict dispersion compensation is therefore necessary in a 40 Gb/s long-distance DSF transmission system.

In optical transmission systems with transmission speeds up to 10 Gb/s, since the dispersion tolerance is relatively wide, system design is possible that allows the common use of a dispersion compensator having a predefined dispersion value, such as a dispersion-compensating fiber (DCF) or a fiber grating, over a transmission distance of 20 to 40 km. However, when the dispersion compensation tolerance is extremely small, as in 40 Gb/s systems, the amount of dispersion compensation must be optimized for each repeater section. The only ways to achieve such dispersion compensation, at the present time, are:

(i) To fabricate a dispersion compensator that matches the actually measured value of the chromatic dispersion of the transmission line; or (ii) To prepare "units" of DCFs or fiber gratings whose dispersion values are different by small amounts, and change the combination of units to be inserted according to the actually measured value of the chromatic dispersion, similar to the manner in which an object is weighed on a balance.

In the case of (ii), however, if multiple units are connected, the apparatus size increases. Moreover, if the units are joined together by connectors, the total insertion loss increases. If the value of the chromatic dispersion is unknown, optimization can be achieved by inserting and removing units, but this leads to an enormous increase in man-hours and also a waste of units.

Furthermore, neither (i) nor (ii) can be applied to cases where the value of the chromatic dispersion changes over time due to transmission line (waveguide) temperature, external pressures, or vibrations.

Therefore, for an ultra high-speed system such as a 40 Gb/s system, the development of a "variable dispersion compensator" capable of varying the amount of dispersion with a single device is essential. As a variable dispersion compensator, there has been proposed a Planar Lightwave Circuit (PLC) dispersion compensator capable of varying its dispersion amount from −383 ps/nm to +615 ps/nm (for example, see K. Takiguchi et al., ECOC' 93 ThC 12.9, which is incorporated herein by reference). However, a variable dispersion compensator with a variable range of −383 ps/nm to +615 ps/nm can only support transmission distances up to about 20 km in the case of an SMF having a chromatic dispersion value of +18 ps/nm/km. Also, commercial implementation is difficult in terms of manufacturing as well as from the viewpoint of controllability.

There has also been proposed a method in which, in a fiber grating dispersion compensator, a temperature gradient is provided using a Peltier element, or an external stress is applied to the fiber grating itself using piezoelectric elements, to provide the capability to vary the amount of dispersion compensation (for example, see R. I. Raming and N. N. Zervas, ECOC' 96 Short courses, which is incorporated herein by reference). This method, however, involves problems such as complex control and narrow bandwidth (see, for example, M. Kato and Y. Miyajima, OECC' 97 9D1-2, which is incorporated herein by reference), and is not yet ready for commercial implementation.

Therefore, as described above, known or proposed variable dispersion compensators are difficult to design, manufacture, and control, and lack practicability, since they are designed to combine (i) a large dispersion amount with (ii) a large variable range in a single dispersion compensator.

SUMMARY OF THE INVENTION

Accordingly, it is an object of the present invention to provide an apparatus for compensating for chromatic dispersion and nonlinear effects in a transmission line in order to achieve further increases in transmission distance and in transmission capacity.

It is an additional object of the present invention to provide an apparatus that can accurately compensate for chromatic dispersion in a transmission line according to various parameters, such as transmission distance, when transmitting a large-capacity optical signal at a high transmission rate.

For example, an object of the present invention is to provide a dispersion compensation apparatus that can provide the required amount of dispersion compensation in a transmission system that transmits information at 40 Gb/s through a transmission line requiring a large amount of dispersion compensation. For example, such a transmission line may have a chromatic dispersion value of, for example, +18 ps/nm/km, and the transmission distance may be, for example, 20 km or longer.

Additional objects and advantages of the invention will be set forth in part in the description which follows, and, in part, will be obvious from the description, or may be learned by practice of the invention.

The foregoing objects of the present invention are achieved by providing an apparatus which compensates for dispersion in an optical transmission line, wherein the apparatus includes a fixed dispersion compensator and a variable dispersion compensator. The fixed dispersion compensator has a fixed dispersion amount and coarsely compensates for the dispersion in the transmission line. The variable dispersion compensator has a variable dispersion amount and finely compensates for the dispersion in the transmission line.

Objects of the present invention are also achieved by providing an apparatus which compensates for dispersion in an optical transmission line, wherein the apparatus includes a discretely variable dispersion compensator and a continuously variable dispersion compensator. The discretely variable dispersion compensator has a discontinuously variable dispersion amount and coarsely compensates for the dispersion in the transmission line. The continuously variable dispersion compensator has a continuously variable dispersion amount and finely compensates for dispersion in the transmission line.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
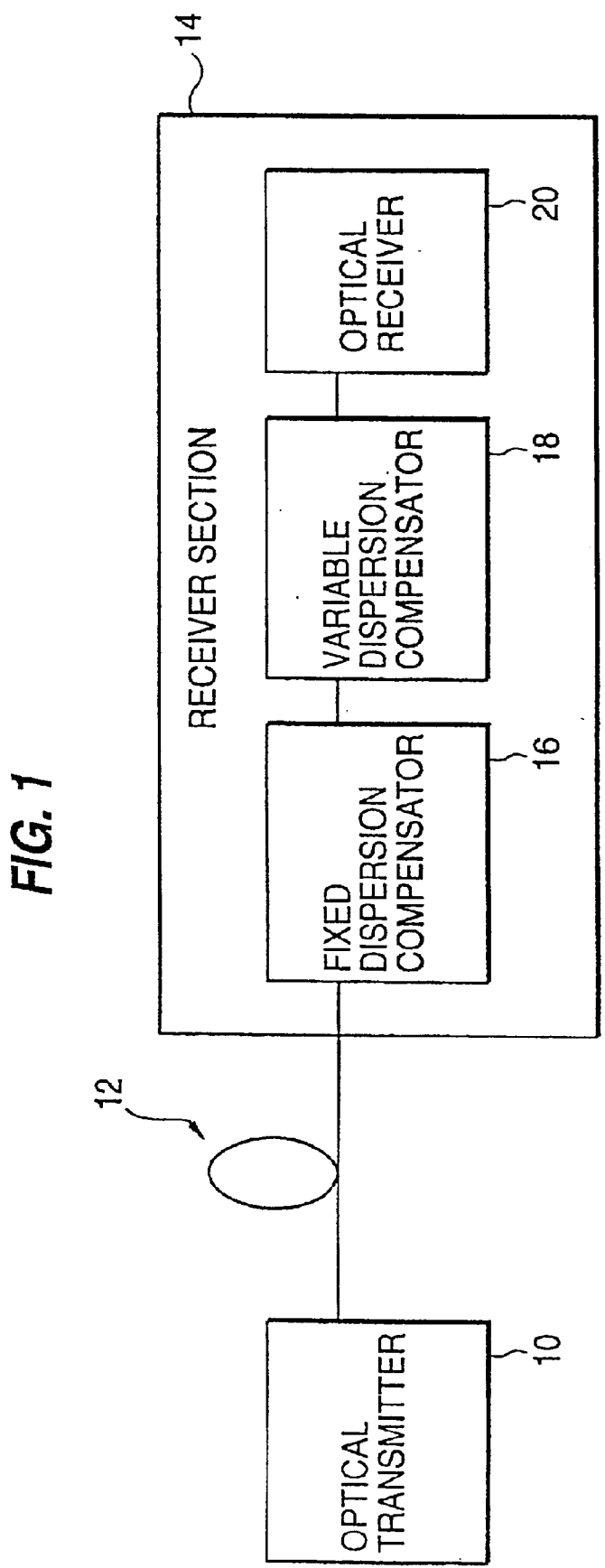
FIG. 1 is a diagram illustrating an optical transmission system, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating an optical transmission system, according to an embodiment of the present invention. Referring now to FIG. 1, a transmitter 10 outputs an optical signal through an SMF 12. For example, the optical signal is at 1.55 µm wavelength and 40 Gb/s transmission speed, and SMF 12 has zero dispersion at 1.3 µm. The optical signal is received by a receiver section 14 having an optical receiver 20. A fixed dispersion compensator 16 and a variable dispersion compensator 18 are also located in receiver section 14. Fixed dispersion compensator 16 has a dispersion amount which is preferably selected from several choices according to the length of SMF 12. Variable dispersion compensator 18 is capable of varying the amount of dispersion compensation according to parameters such as transmission distance.

Moreover, fixed dispersion compensator 16 provides coarse dispersion compensation, and variable dispersion compensator 18 provides fine dispersion compensation. Here, "coarse" and "fine" are relative terms, where "coarse" refers to a larger amount of compensation than "fine". Therefore, fixed dispersion compensator 16 provides a relatively large amount of fixed compensation, and variable dispersion compensator 18 essentially "fine-tunes" the amount of compensation so that an accurate amount of total compensation is provided.

Fixed dispersion compensator 16 can be constructed, for example, from a dispersion-compensating fiber (DCF) whose fiber core has a refractive index graded with a special profile in the radial direction thereof, thereby providing dispersion opposite in sign (i.e., negative) to dispersion (positive) in an ordinary SMF, or from a fiber grating dispersion compensator in which a Bragg grating with changing refractive index is formed in the fiber core to provide negative dispersion.

Variable dispersion compensator 18 can be constructed from the previously mentioned PLC dispersion compensator or from one in which the dispersion amount is varied by providing a stress gradient or temperature gradient to a fiber grating.

An example of the latter type, i.e, the variable dispersion compensator achieved by applying a stress to the fiber grating (see M. M. Ohm et al., "Tunable Fiber Grating Dispersion Using a Piezoelectric Stack," OFC' 97 Technical Digest, WJ3, pp. 155–156, which is incorporated herein by reference), will be described as an example.

Figure 2:
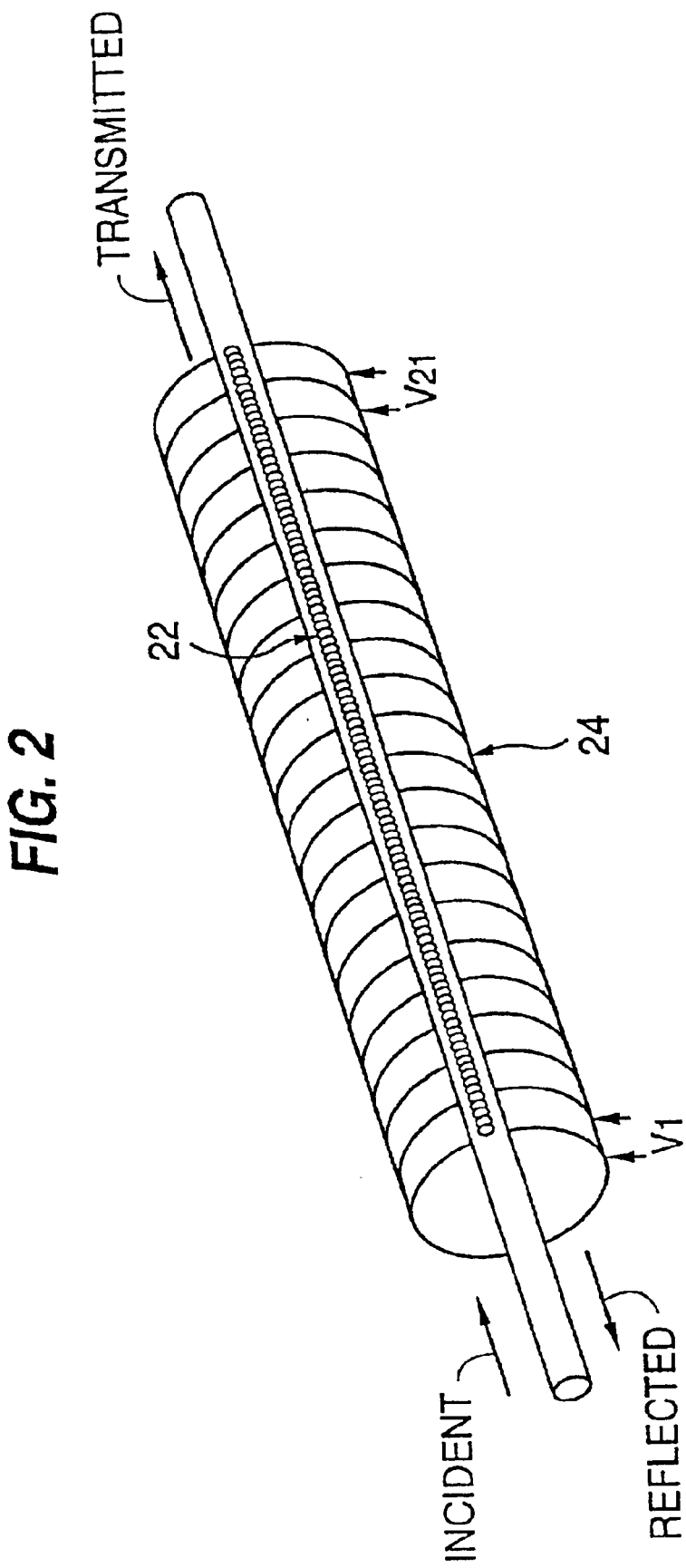
FIG. 2 is a diagram illustrating a variable dispersion compensator, according to an embodiment of the present invention.
Figure 3:
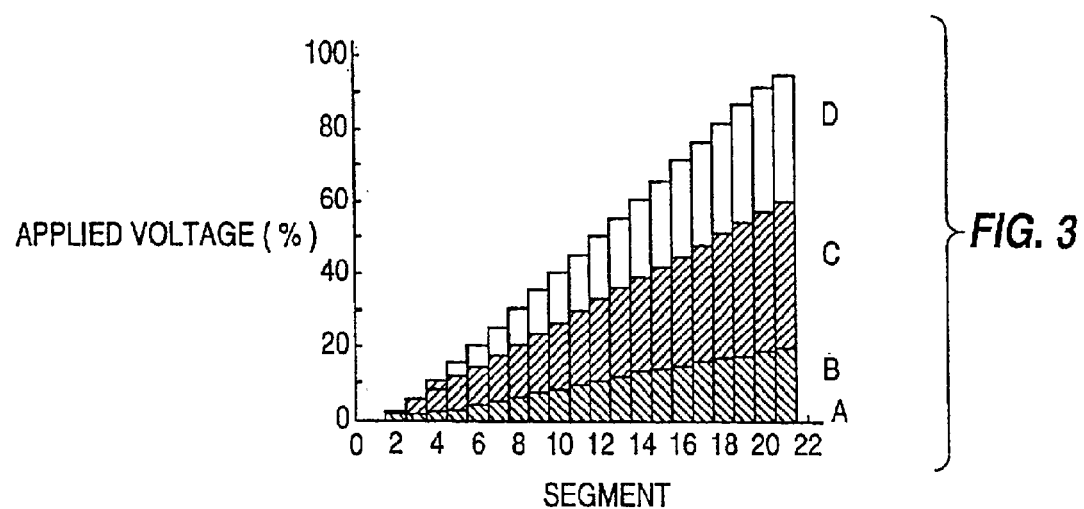
FIG. 3 is a graph illustrating patterns A to D of voltages $V_1$ to $V_{21}$ applied to segments of the variable dispersion compensator of FIG. 2, according to an embodiment of the present invention.
Figure 4:
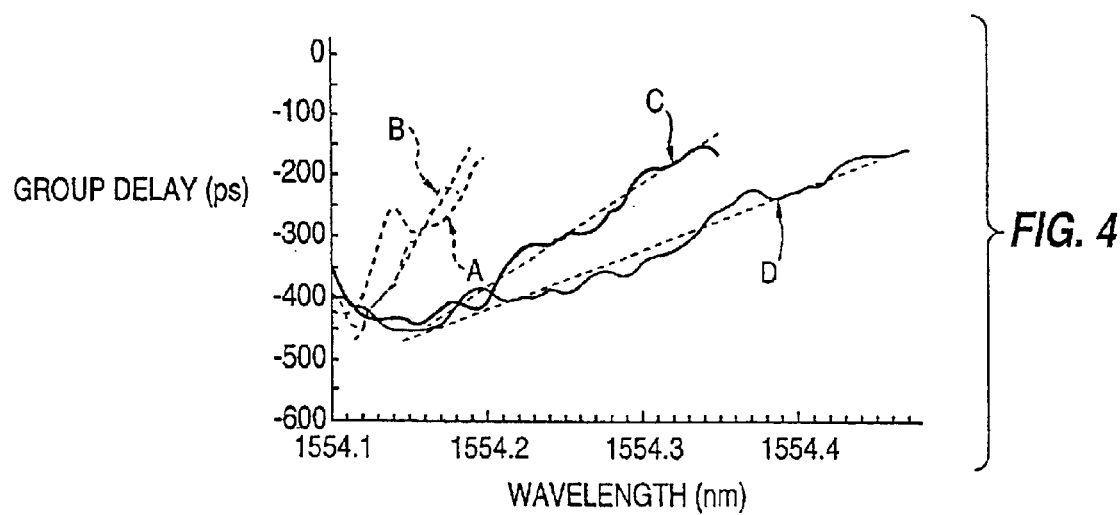
FIG. 4 is a graph illustrating dispersion values for the voltage patterns A to D in FIG. 3, according to an embodiment of the present invention.

More specifically, FIG. 2 is a diagram illustrating a variable dispersion compensator, according to an embodiment of the present invention. FIG. 3 is a graph illustrating patterns A to D of voltages $V_1$ to $V_{21}$ applied to segments of the variable dispersion compensator of FIG. 2, according to an embodiment of the present invention. FIG. 4 is a graph illustrating dispersion values for the voltage patterns A to D in FIG. 3, according to an embodiment of the present invention.

As shown in FIG. 2, a piezoelectric element 24 is attached to each of 21 segments of a chirped fiber grating 22. When voltages $V_1$ to $V_{21}$, with a gradient such as shown in FIG. 3, are applied to the piezoelectric elements, the pressure being applied in the longitudinal direction of grating 22 changes, and for the voltage patterns A to D shown in FIG. 3, the dispersion values (slopes of the lines) change as shown in FIG. 4. Here, the dispersion values can, of course, be varied continuously by giving intermediate voltage patterns between those shown.

Figure 5:
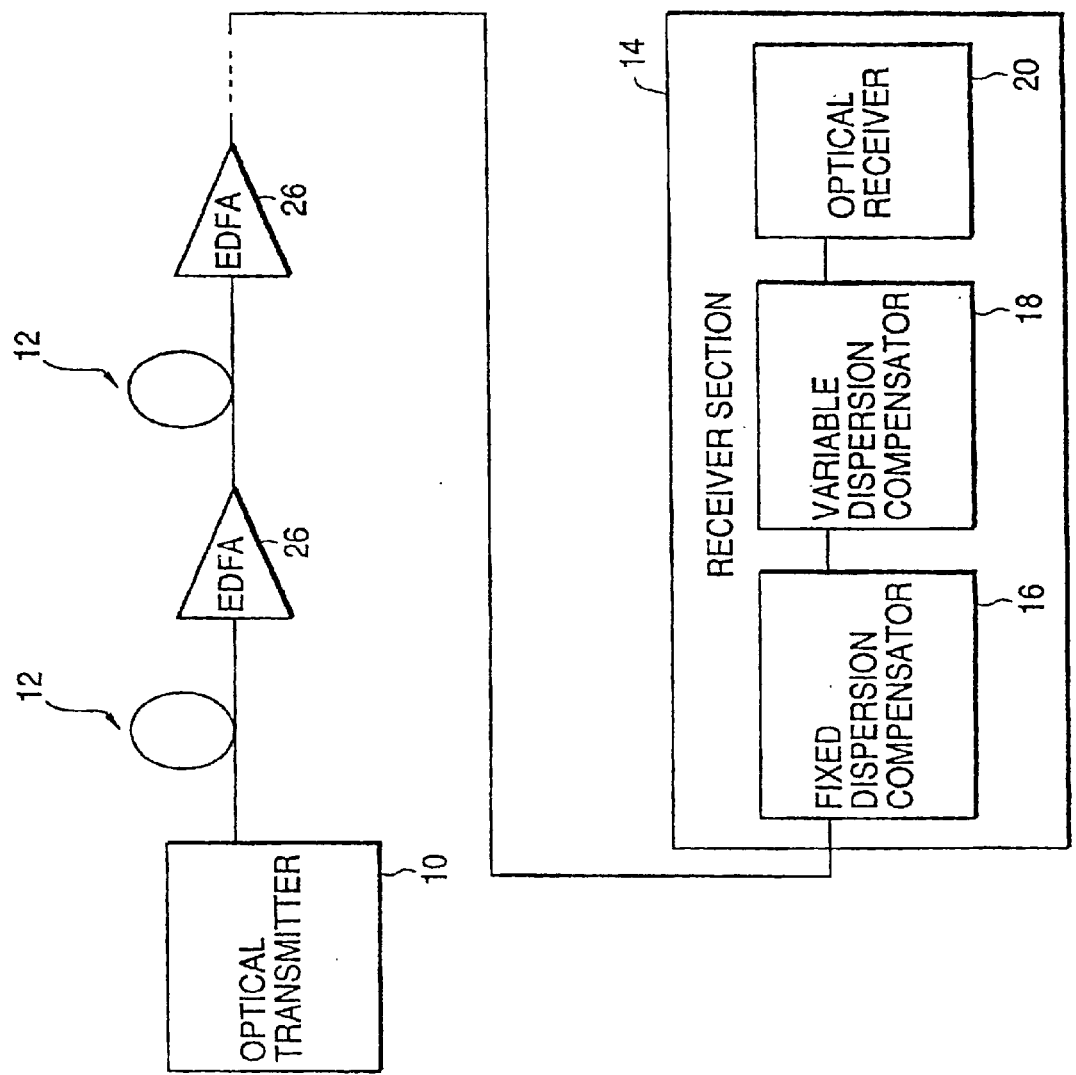
FIG. 5 is a diagram illustrating a modification of the optical transmission system of FIG. 1, according to an embodiment of the present invention.

FIG. 5 is a diagram illustrating a modification of the optical transmission system of FIG. 1, according to an embodiment of the present invention. More specifically, FIG. 5 shows an example in which the optical transmission system includes an optical amplifier-repeater that amplifies and relays an optical signal without regenerating it.

Referring now to FIG. 5, many optical amplifier-repeaters each having an erbium doped fiber amplifier (EDFA) 26 are installed at intermediate points along the transmission line to relay the optical signal without regenerating it. As in the configuration of FIG. 1, fixed dispersion compensator 16 and variable dispersion compensator 18 are located in receiver section 14.

Figure 6:
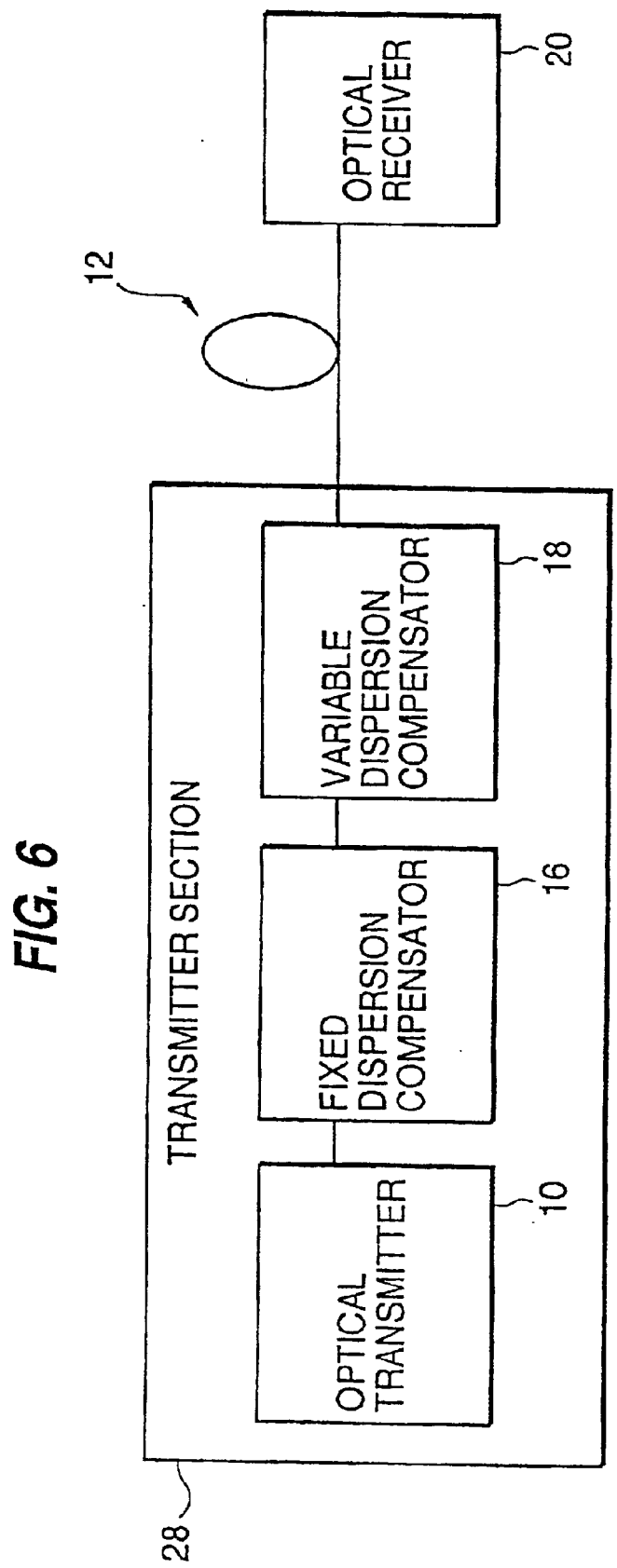
FIG. 6 is a diagram illustrating a modification of the optical transmission system of FIG. 1, according to an embodiment of the present invention.
Figure 7:
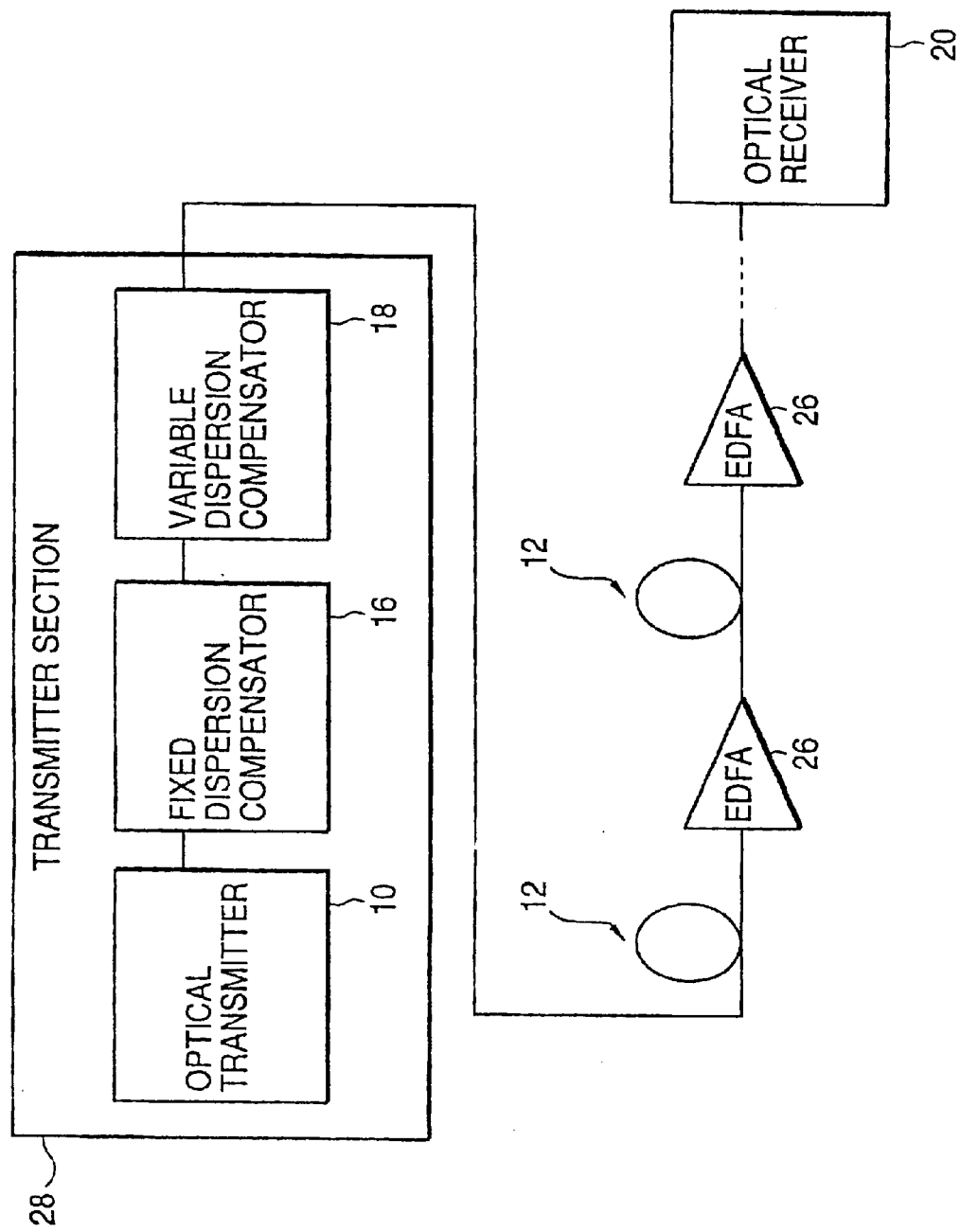
FIG. 7 is a diagram illustrating an additional modification of the optical transmission system of FIG. 1, according to an embodiment of the present invention.

In the examples of FIGS. 1 and 5, the order of fixed dispersion compensator 16 and variable dispersion compensator 18 may be interchanged. Alternatively, as shown in FIGS. 6 and 7, fixed dispersion compensator 16 and variable dispersion compensator 18 may be provided in a transmitter section 28 where optical transmitter 10 is located. Also, in that case, their order can be interchanged.

Figure 8:
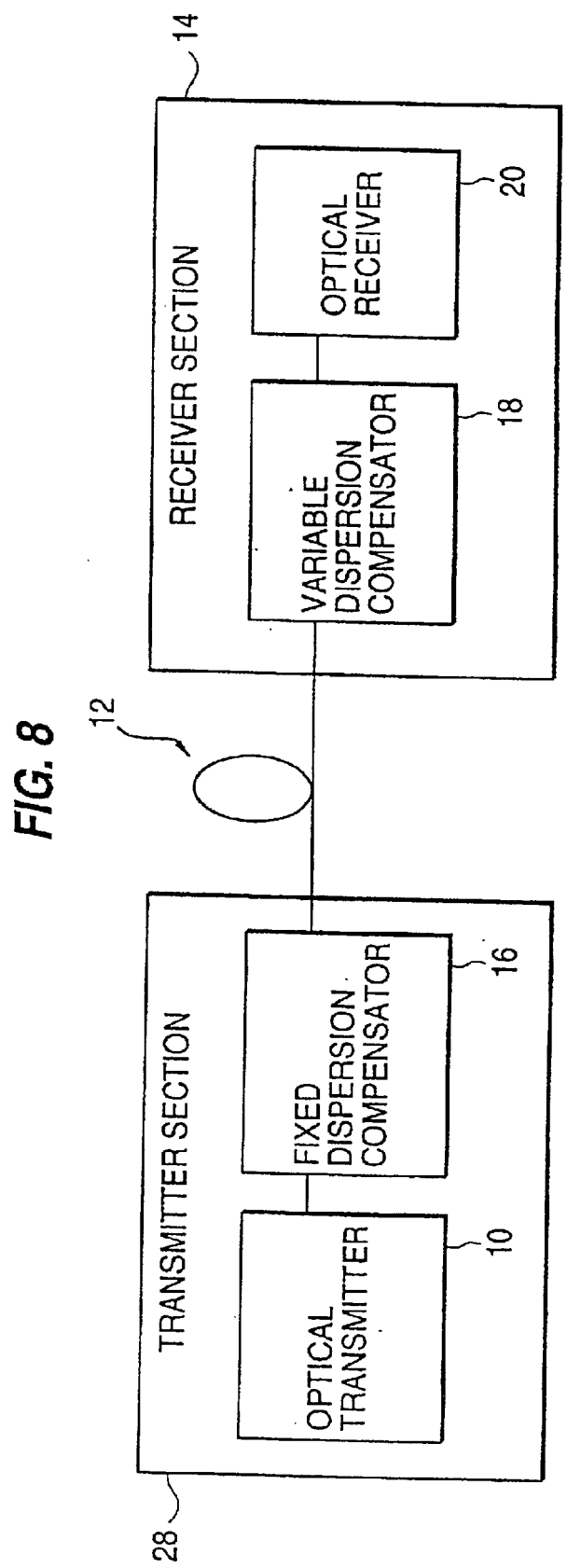
FIG. 8 is a diagram illustrating a modification of the optical transmission system of FIG. 1, according to an embodiment of the present invention.
Figure 9:
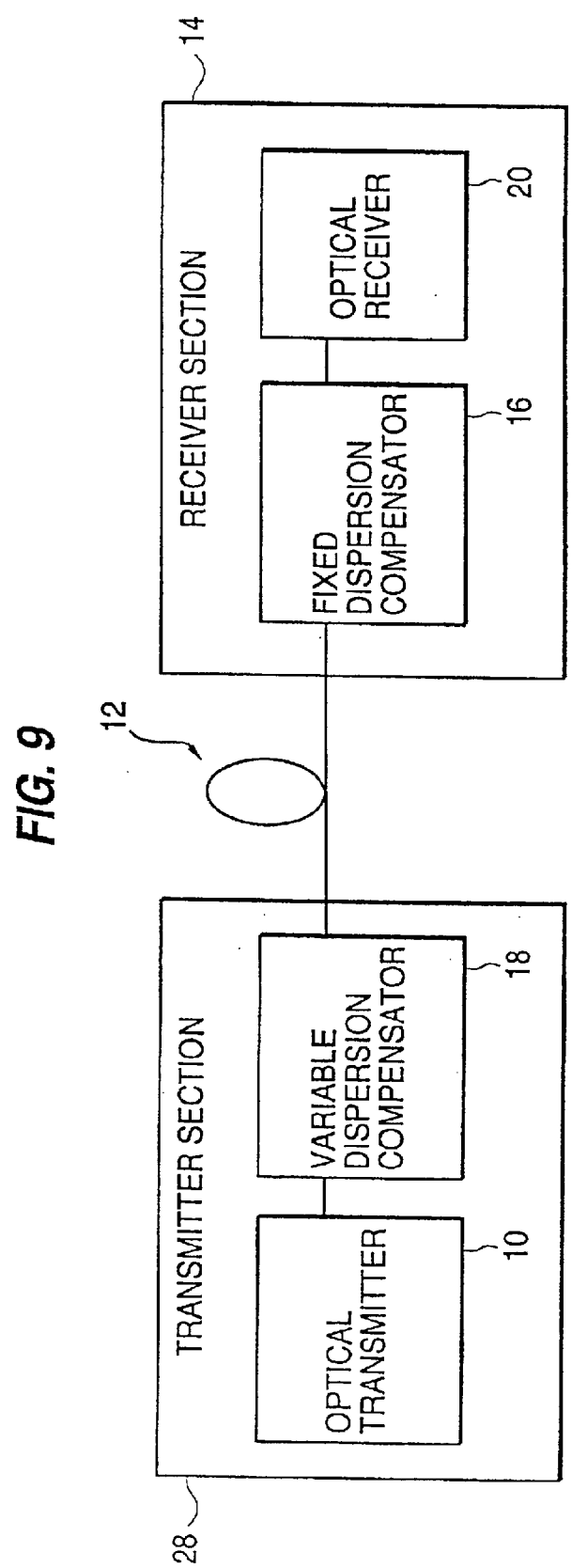
FIG. 9 is a diagram illustrating a modification of the optical transmission system of FIG. 1, according to an embodiment of the present invention.

Moreover, as shown in FIGS. 8 and 9, fixed dispersion compensator 16 and variable dispersion compensator 18 may be positioned so that one is in transmitter section 28 and the other is in receiver section 14.

Figure 10:
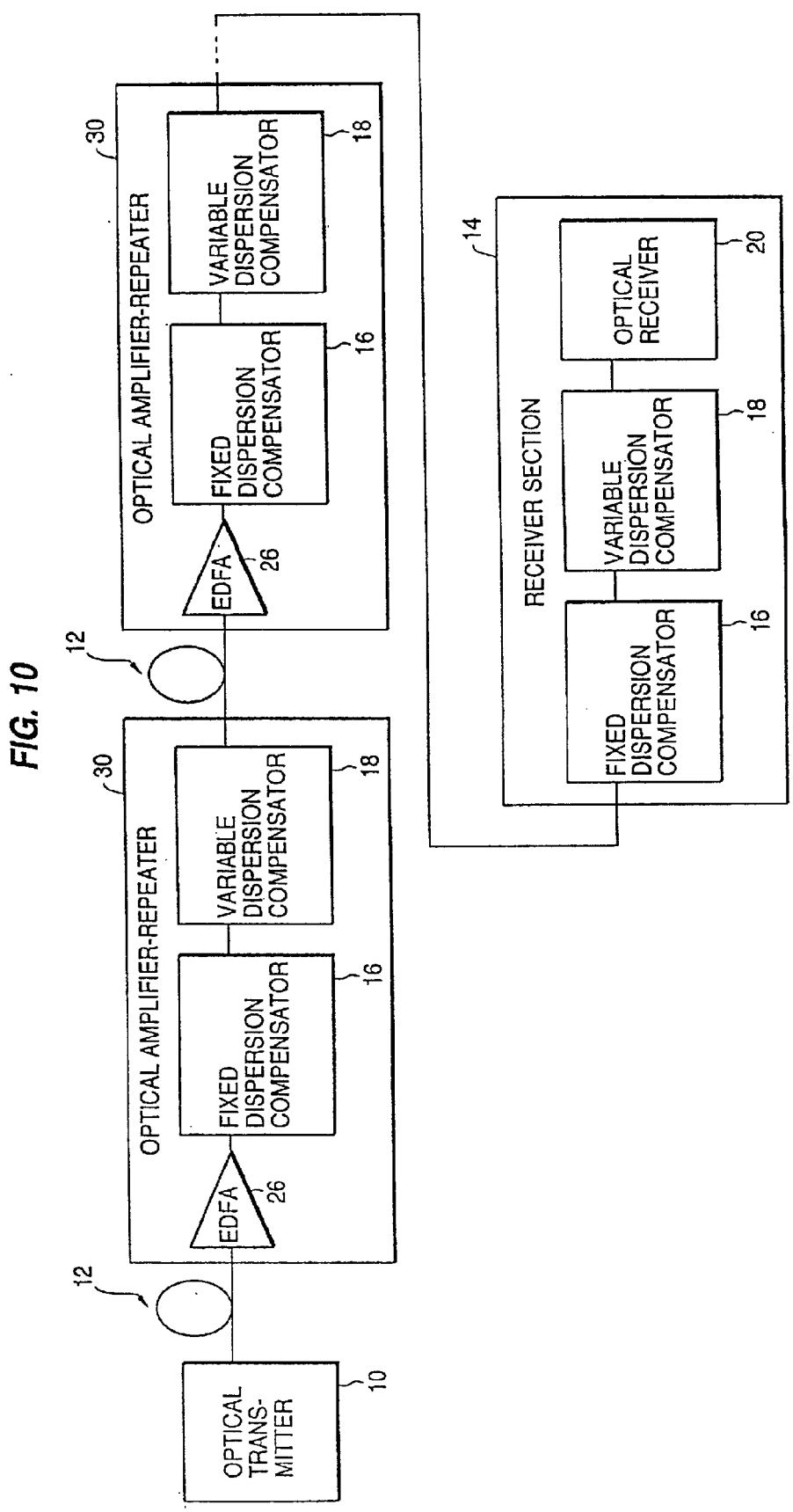
FIG. 10 is a diagram illustrating an additional modification of the optical transmission system of FIG. 1, according to an embodiment of the present invention.

Further, as shown in FIG. 10, fixed dispersion compensator 16 and variable dispersion compensator 18 may also be provided in each optical amplifier-repeater 30. In FIG. 10, dispersion compensators 16 and 18 are provided in every optical amplifier-repeater 30, but these may be provided only in designated optical amplifier-repeaters. Further, in FIG. 10, a fixed dispersion compensator 16 and a variable dispersion compensator 18 are provided in receiver section 14, but, instead, they may be provided at the transmitting end.

Figure 11:
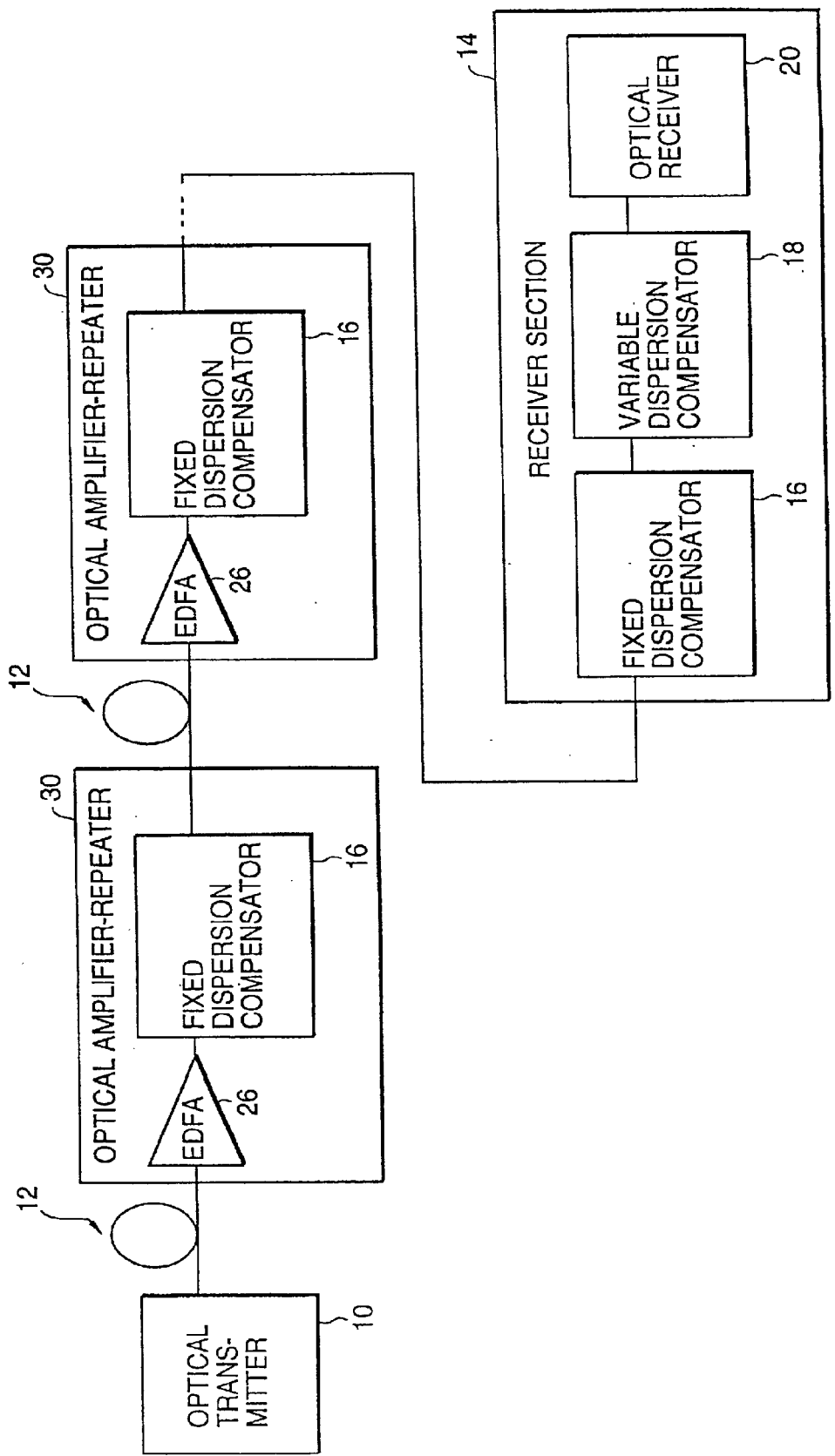
FIG. 11 is a diagram illustrating a modification of the optical transmission system of FIG. 1, according to an embodiment of the present invention.

Alternatively, as shown in FIG. 11, only fixed dispersion compensator 16 may be provided in each optical amplifier-repeater 30 to perform coarse dispersion compensation, and variable dispersion compensator 18 may be provided only in receiver section 14 to perform fine dispersion compensation. In this case, variable dispersion compensator 18 may be provided at the transmitting end, not in receiver section 14.

Also, more than one variable dispersion compensator 18 can be provided in the system. Further, fixed dispersion compensator 16 may be provided only in designated optical amplifier-repeaters, not in every optical amplifier-repeater 30.

Therefore, according to embodiments of the present invention, a fixed dispersion compensator has a fixed dispersion amount, and coarsely compensates for dispersion in the transmission line. A variable dispersion compensator has a variable dispersion amount, and finely compensates for dispersion in the transmission line. Preferably, the fixed dispersion compensator and the variable dispersion compensator together provide a total amount of dispersion compensation substantially equal to the amount of dispersion of the transmission line.

As indicated above, the fixed dispersion compensator provides coarse dispersion compensation, and the variable dispersion compensator provides fine dispersion compensation. As previously noted, "coarse" and "fine" are relative terms, where "coarse" refers to a larger amount of compensation than "fine". Therefore, the fixed dispersion compensator provides a relatively large amount of fixed compensation, and the variable dispersion compensator essentially "fine-tunes" the amount of compensation so that an accurate amount of total compensation is provided.

Typically, the amount of compensation provided by the variable dispersion compensator will be less than or equal to 20% of that provided by the fixed dispersion compensator. As an example, in a 40 Gb/s transmission system, with an SMF transmission line of 50 km, the total dispersion is typically about 920 ps/nm. In this case, as an example, the fixed dispersion compensator could provide approximately −850 ps/nm of dispersion compensation, and the variable dispersion compensator could provide variable dispersion compensation in the range of 0 to −150 ps/nm. (Thus, −150/−850=0.176, that is, less then or equal to 20%.)

The above embodiments of the present invention are very effective in fine tuning the total amount of dispersion compensation to adjust for changes in environmental conditions, and changes in system specifications from the ideal specification. As an example, assume that a plurality of repeaters are supposed to be spaced along a transmission line at intervals of 50 km. If the repeaters are spaced at exactly 50 km intervals, an individual fixed dispersion compensator (such as a DCF) can be used by itself for each 50 km interval, to compensate for dispersion. Since the interval between repeaters is exactly 50 km, the exact amount of required dispersion can be determined and compensated for by the fixed dispersion compensator. However, in actuality, the interval between each repeater may not be exactly 50 km. For example, some repeaters may be spaced by 49 km, 51 km or 52 km. In this case, the variable dispersion compensator can be used to fine tune the total amount of compensation, to adjust for the changes in interval between repeaters. The variable dispersion compensator can also adjust, for example, for environmental changes over time. Such a variable dispersion compensation can be positioned at many different locations, such as in the transmitter, the receiver or in a repeater. Moreover, a plurality of such variable dispersion compensators can be provided to provide the required "fine-tuning".

Figure 12:
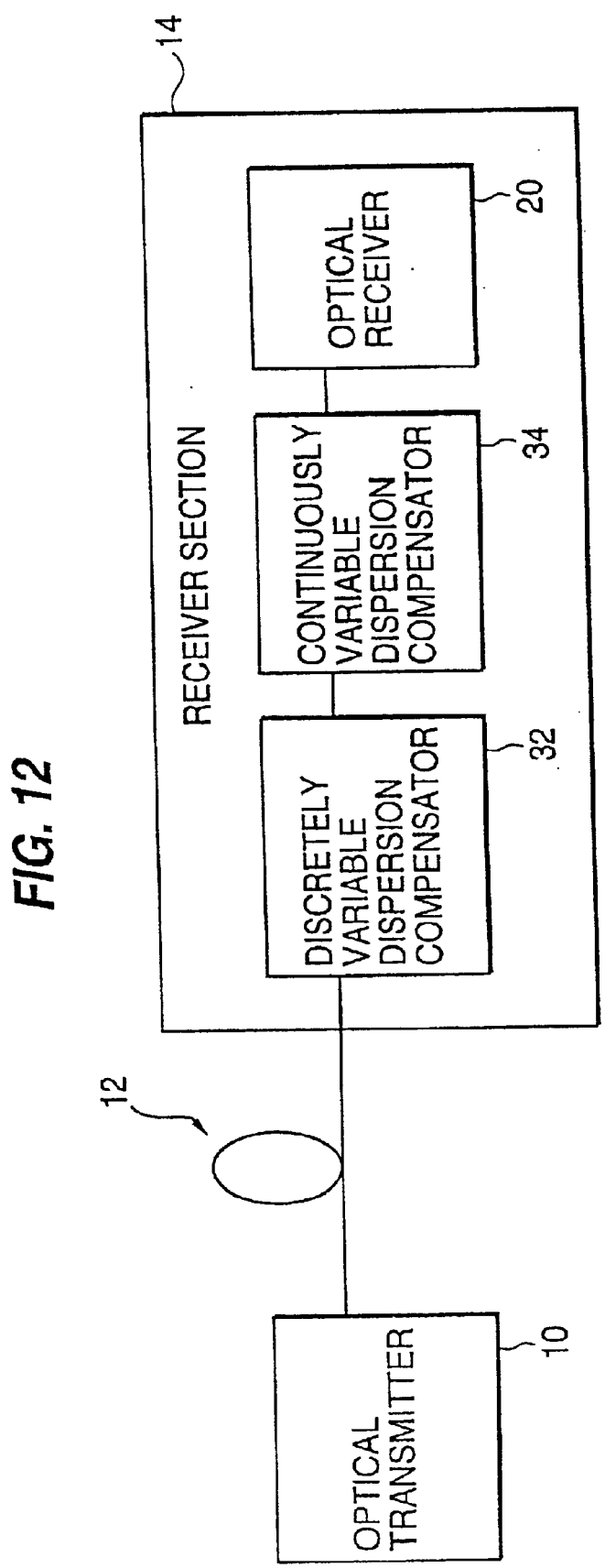
FIG. 12 is a diagram illustrating an optical transmission system, according to a further embodiment of the present invention.

FIG. 12 is a diagram illustrating an optical transmission system, according to a further embodiment of the present invention. Referring now to FIG. 12, a discretely variable dispersion compensator 32 and a continuously variable dispersion compensator 34 are located in receiver section 14.

Figure 13:
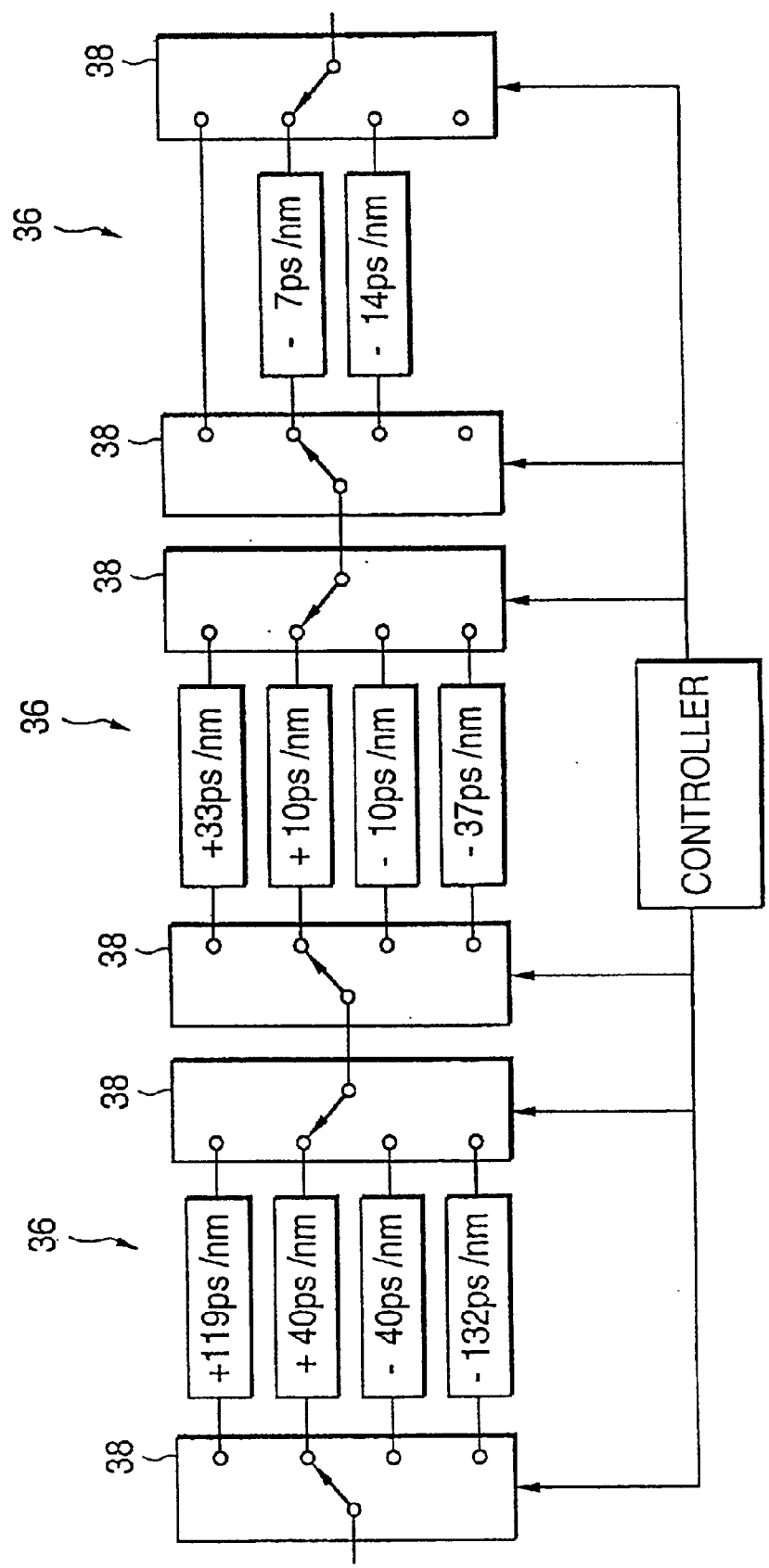
FIG. 13 is a diagram illustrating a discretely variable dispersion compensator, according to an embodiment of the present invention.

FIG. 13 is a diagram illustrating discretely variable dispersion compensator 32. See also, A. Sano et al., ECOC' 96, Tud.3.5, which is incorporated herein by reference. Referring now to FIG. 13, discretely variable dispersion compensator 32 has a dispersion amount capable of being varied discontinuously. Discretely variable dispersion compensator 32 includes DCFs 36 having positive or negative dispersion values cascaded with 1×4 switches 38. In the illustrated example, the dispersion value can be set in increments of about 7 ps/nm between −183 ps/nm and +152 nm. The DCFs may be replaced by other devices, such as fiber gratings, that can set a fixed dispersion value. The present invention is not intended to be limited to this specific example, and many other configurations can be used for a discretely variable dispersion compensator. For example, virtually any number of DCFs and switches can be used to provide many different configurations, and elements other than DCFs and switches can be used.

Continuously variable dispersion compensator 34 can be constructed, for example, from the previously mentioned PLC dispersion compensator or from a fiber grating provided with a stress gradient or temperature gradient.

Figure 14:
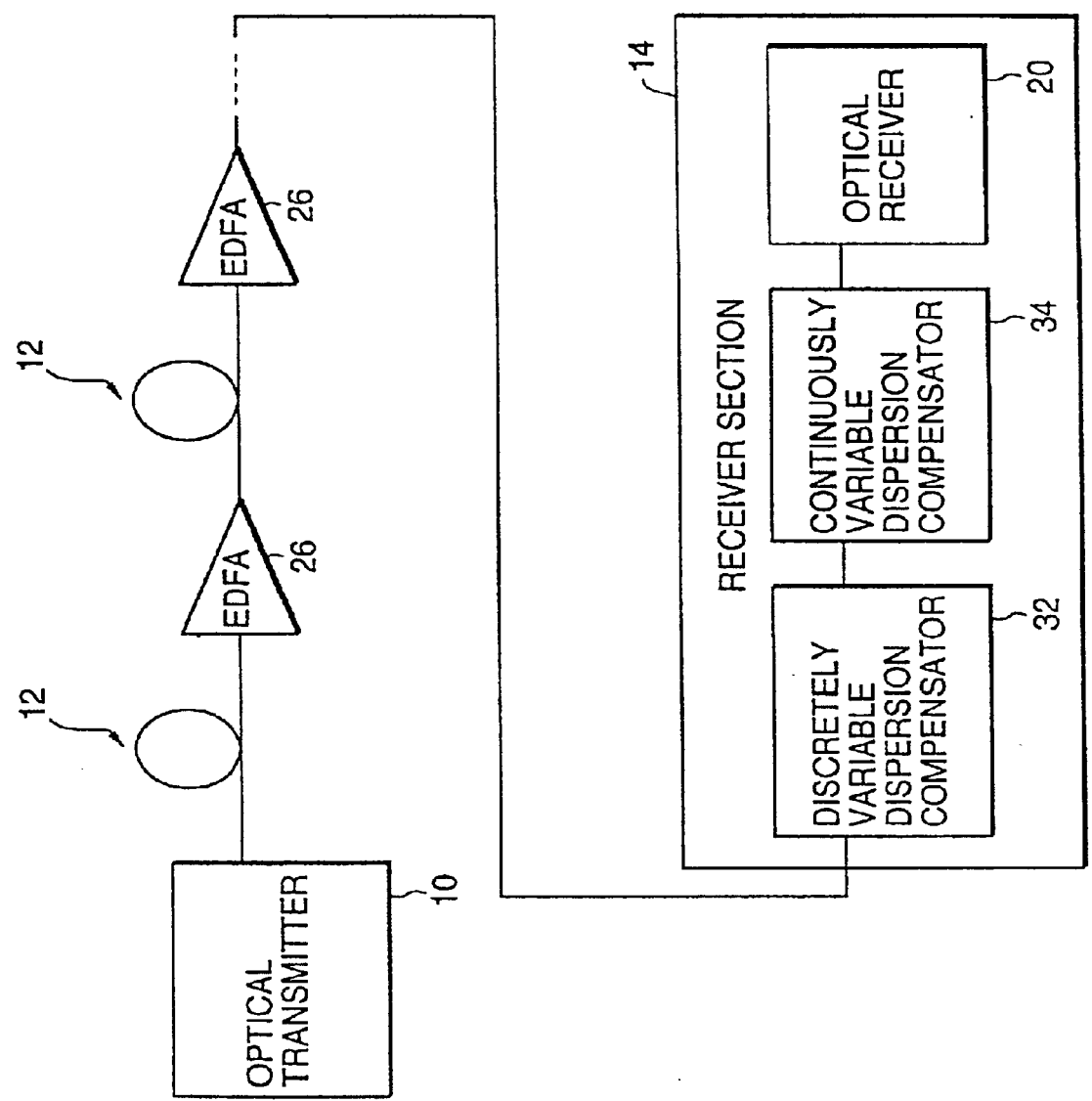
FIG. 14 is a diagram illustrating a modification of the optical transmission system of FIG. 12, according to an embodiment of the present invention.

FIG. 14 is a diagram illustrating a modification of the optical transmission system of FIG. 12, according to an embodiment of the present invention. More specifically, FIG. 14 shows an example of an optical amplifier-repeater transmission system. As in the configuration of FIG. 12, discretely variable dispersion compensator 32 and continuously variable dispersion compensator 34 are located in receiver section 14.

Figure 15:
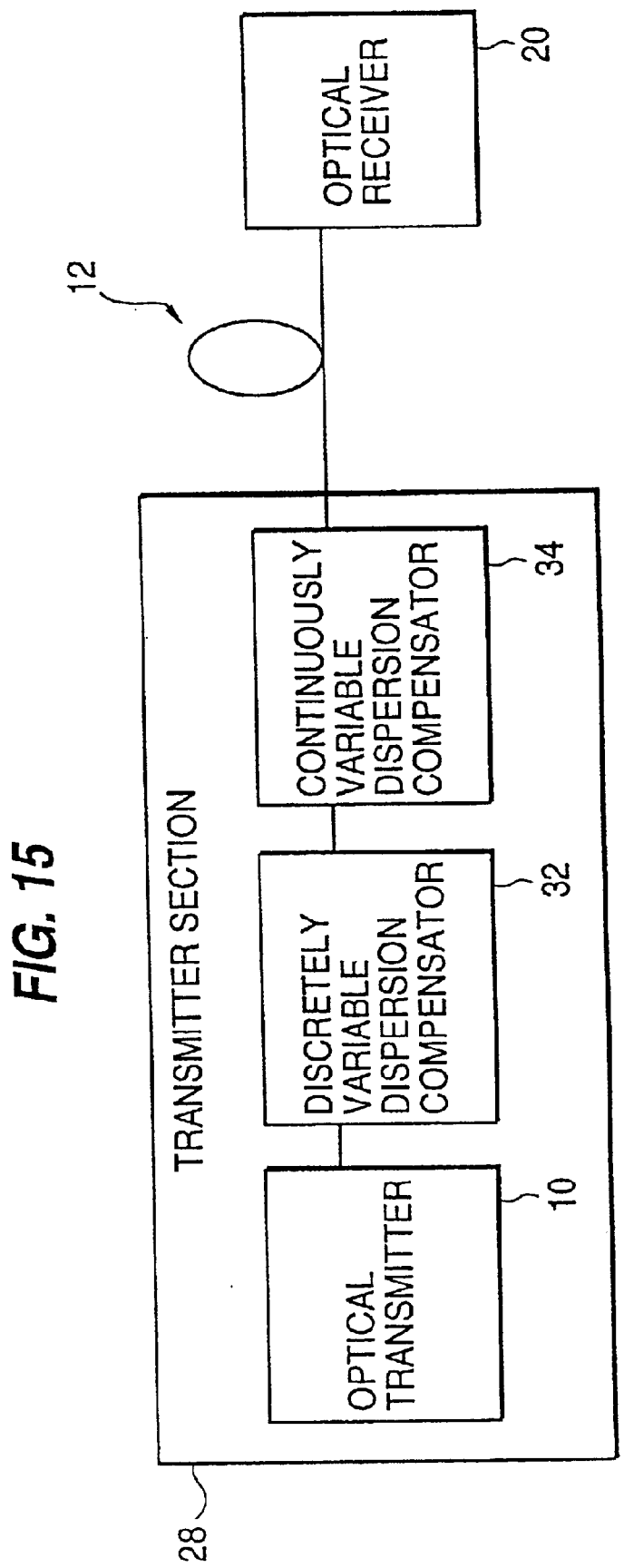
FIG. 15 is a diagram illustrating a modification of the optical transmission system of FIG. 12, according to an embodiment of the present invention.
Figure 16:
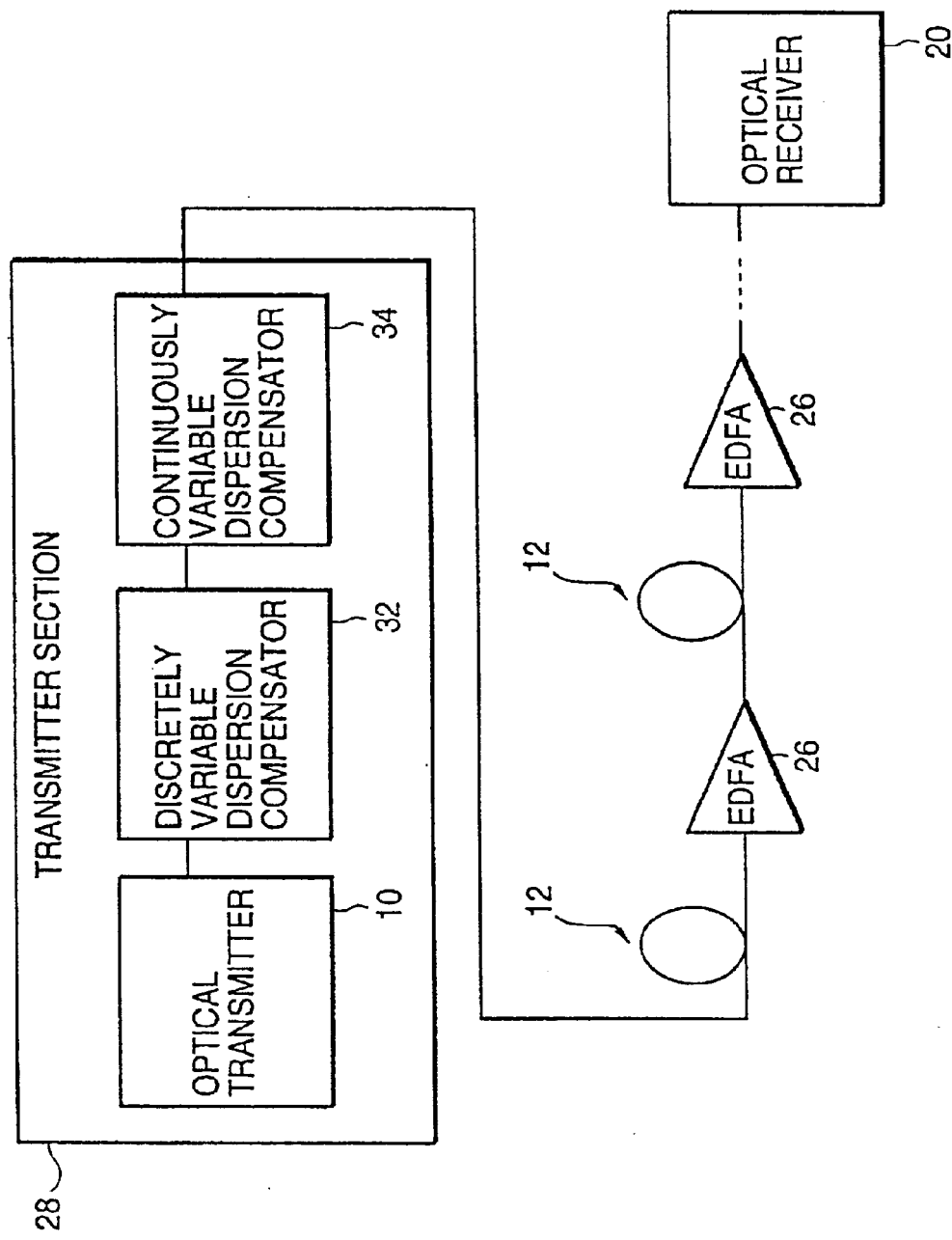
FIG. 16 is a diagram illustrating a modification of the optical transmission system of FIG. 12, according to an embodiment of the present invention.
Figure 17:
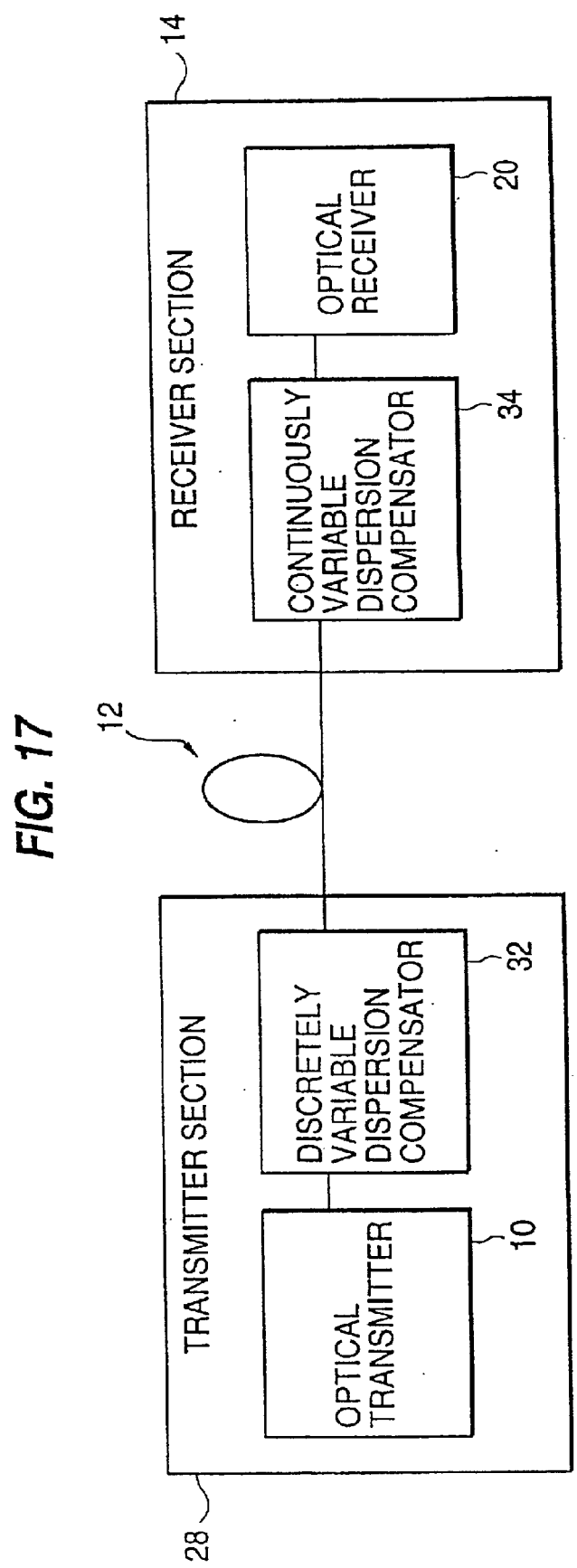
FIG. 17 is a diagram illustrating a modification of the optical transmission system of FIG. 12, according to an embodiment of the present invention.
Figure 18:
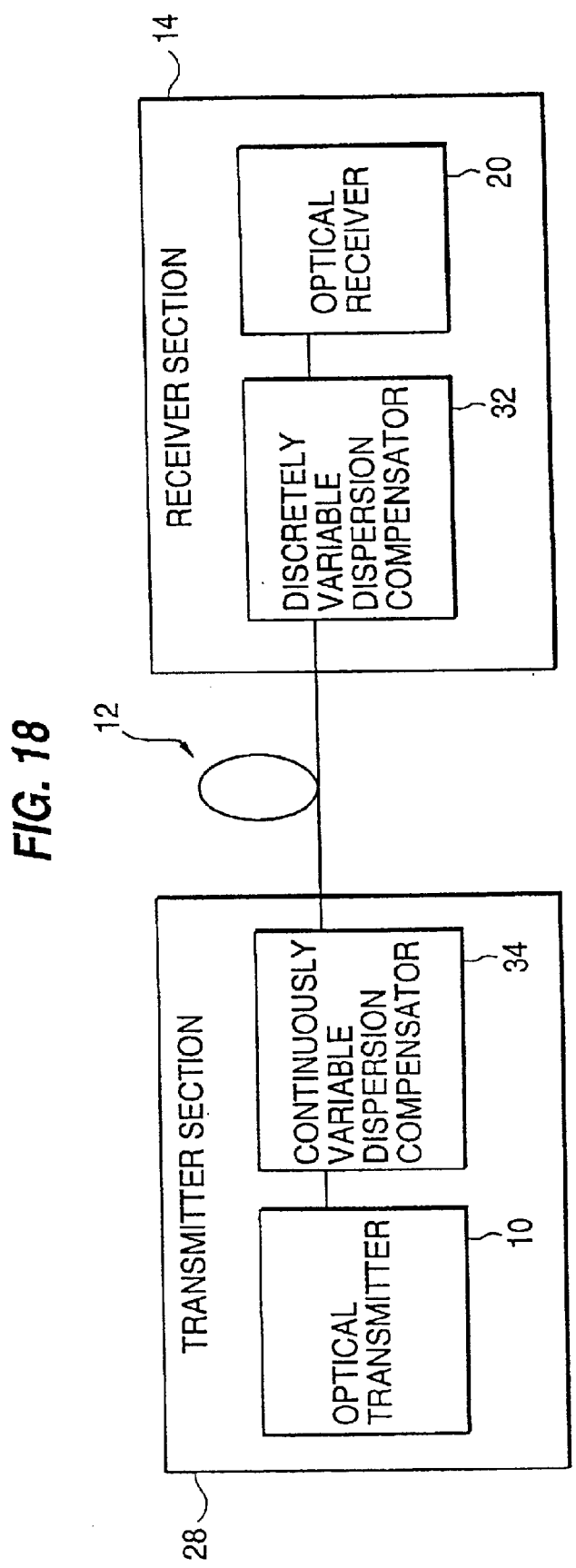
FIG. 18 is a diagram illustrating a modification of the optical transmission system of FIG. 12, according to an embodiment of the present invention.

In the examples of FIGS. 12 and 14, the order of discretely variable dispersion compensator 32 and continuously variable dispersion compensator 34 may be interchanged. Alternatively, as shown in FIGS. 15 and 16, these compensators may be provided in transmitter section 28. Also, in that case, their order can be interchanged. Further, as shown in FIGS. 17 and 18, discretely variable dispersion compensator 32 and continuously variable dispersion compensator 34 can be positioned so that one is in transmitter section 28 and the other in receiver section 14.

Figure 19:
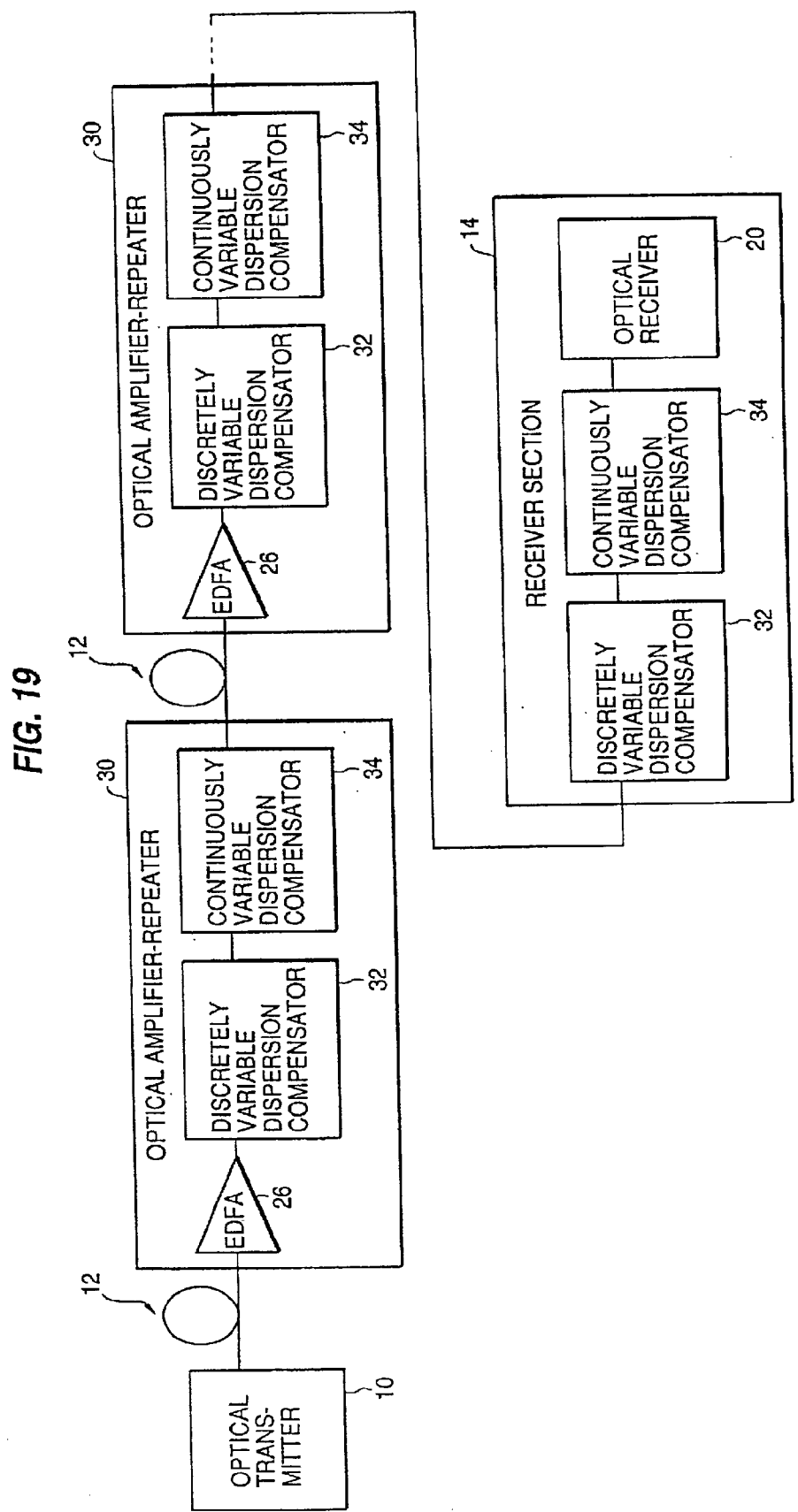
FIG. 19 is a diagram illustrating a modification of the optical transmission system of FIG. 12, according to an embodiment of the present invention.

As an additional example, as shown in FIG. 19, discretely variable dispersion compensator 32 and continuously variable dispersion compensator 34 may be provided in each optical amplifier-repeater 30. In FIG. 19, dispersion compensators 32 and 34 are provided in every optical amplifier-repeater 30, but may be provided only in designated optical amplifier-repeaters. Further, in FIG. 19, dispersion compensators 32 and 34 are provided in receiver section 14 but, instead, may be provided at the transmitting end.

Figure 20:
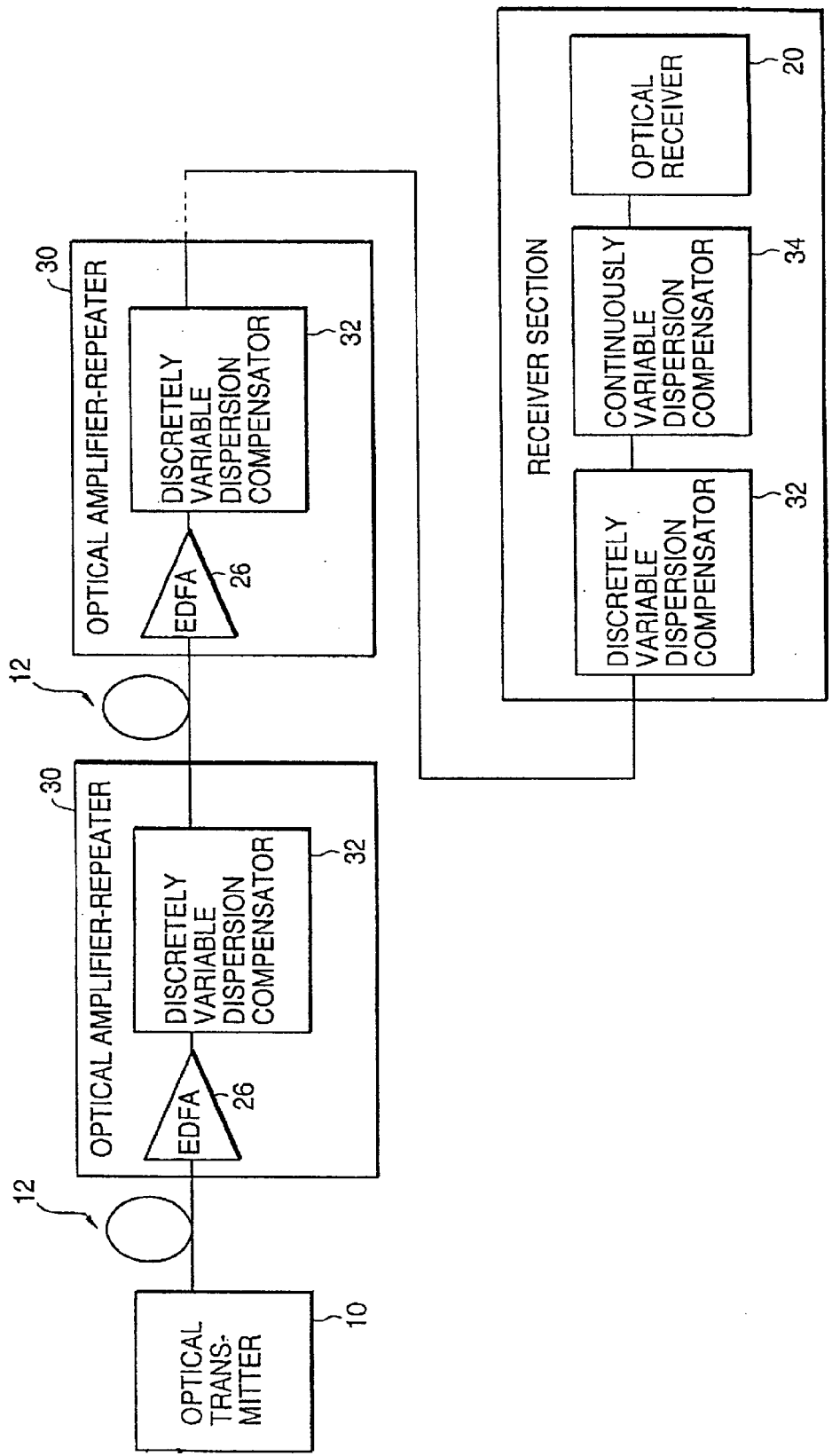
FIG. 20 is a diagram illustrating a modification of the optical transmission system of FIG. 12, according to an embodiment of the present invention.

Alternatively, as shown in FIG. 20, only discretely variable dispersion compensator 32 may be provided in each optical amplifier-repeater 30 to perform coarse dispersion compensation, and continuously variable dispersion compensator 34 may be provided only in receiver section 14 to perform fine dispersion compensation. Moreover, instead, continuously variable dispersion compensator 34 may be provided at the transmitting end, not in receiver section 14. Further, discretely variable dispersion compensator 32 may be provided only in designated optical amplifier-repeaters, not in every optical amplifier-repeater 30.

In the examples so far described, if the chromatic dispersion value including its variation along fiber length is already known from, for example, transmission waveform simulation, the locations of the dispersion compensators (fixed, continuously variable, and discretely variable) and their dispersion compensation amounts can be determined from the results of the simulation.

On the other hand, if the chromatic dispersion of the transmission line is unknown, a transmission characteristic can be measured and the variable dispersion compensation values can be set in accordance with the measured characteristic, to optimize the transmission characteristics.

Figure 21:
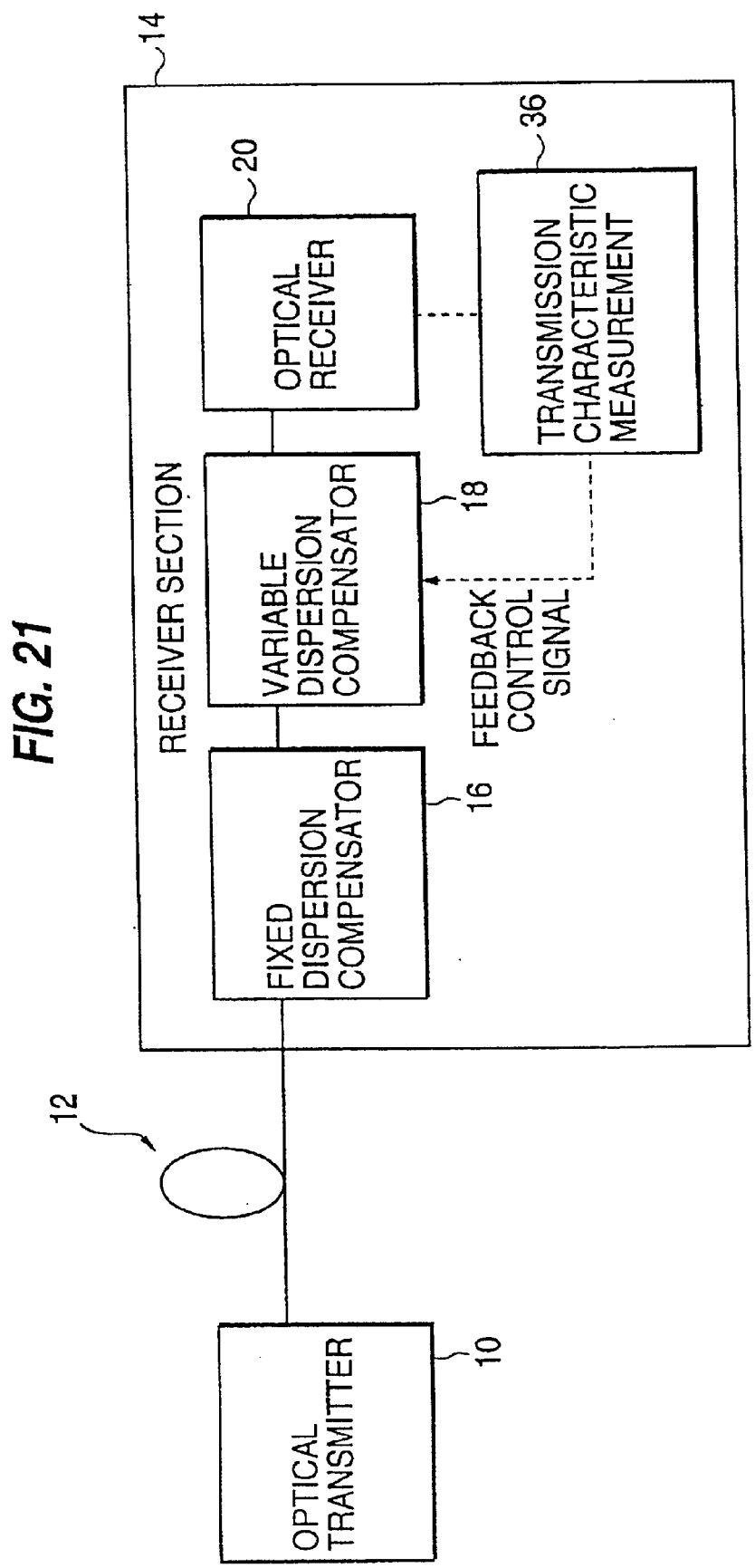
FIG. 21 is a diagram illustrating an optical transmission system, according to a further embodiment of the present invention.
Figure 22:
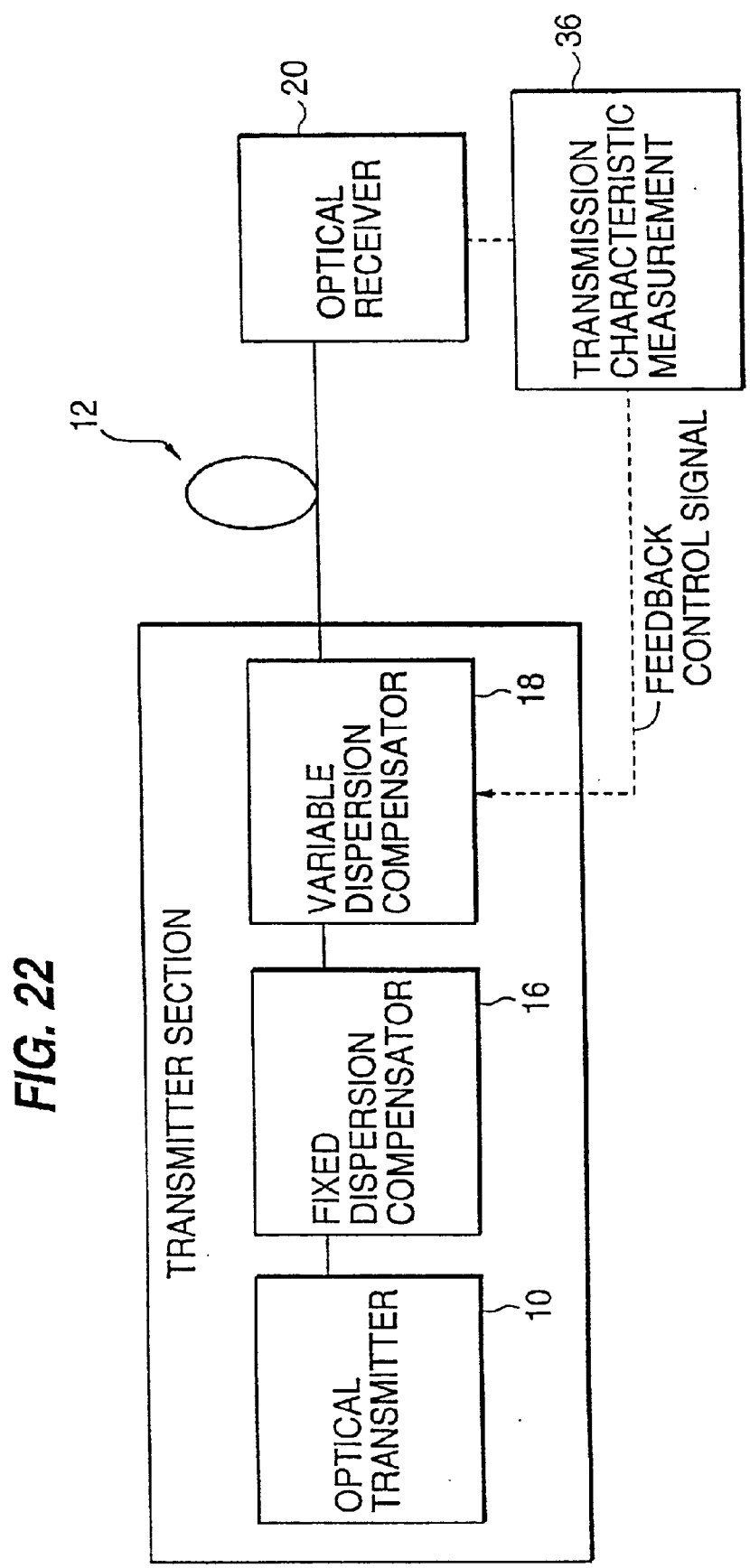
FIG. 22 is a diagram illustrating a modification of the optical transmission system of FIG. 21, according to an embodiment of the present invention.
Figure 23:
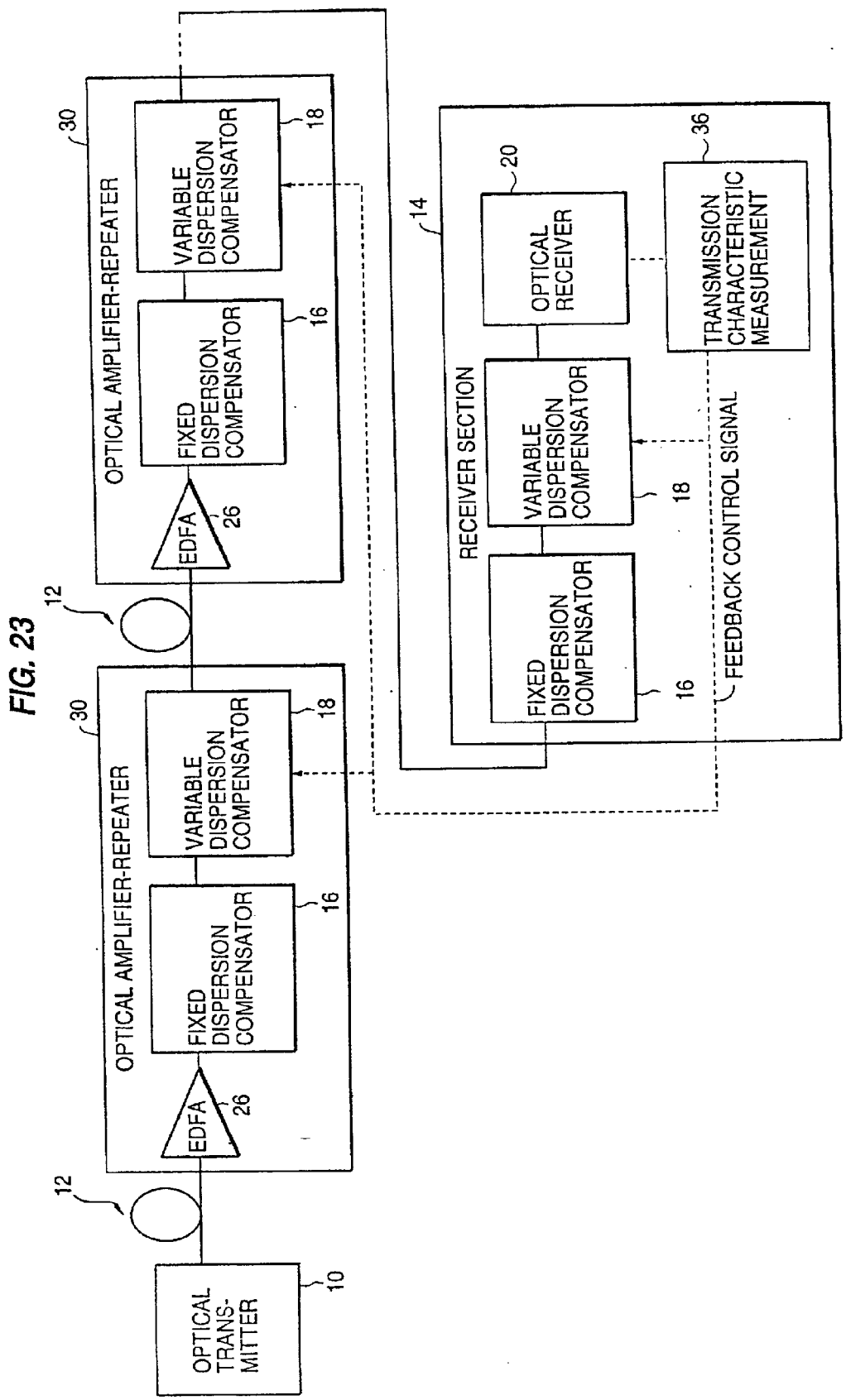
FIG. 23 is a diagram illustrating a modification of the optical transmission system of FIG. 21, according to an embodiment of the present invention.
Figure 24:
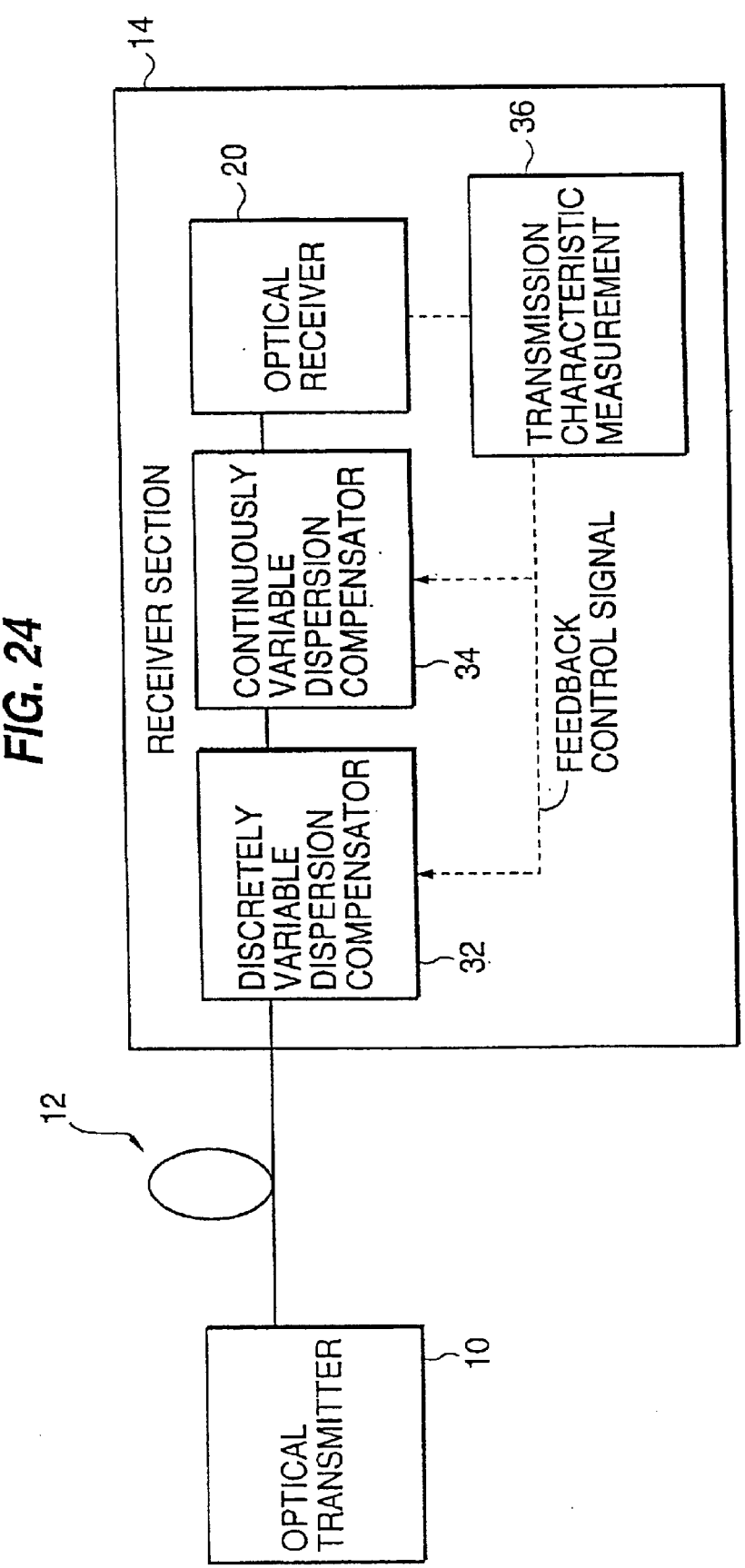
FIG. 24 is a diagram illustrating a modification of the optical transmission system of FIG. 21, according to an embodiment of the present invention.
Figure 25:
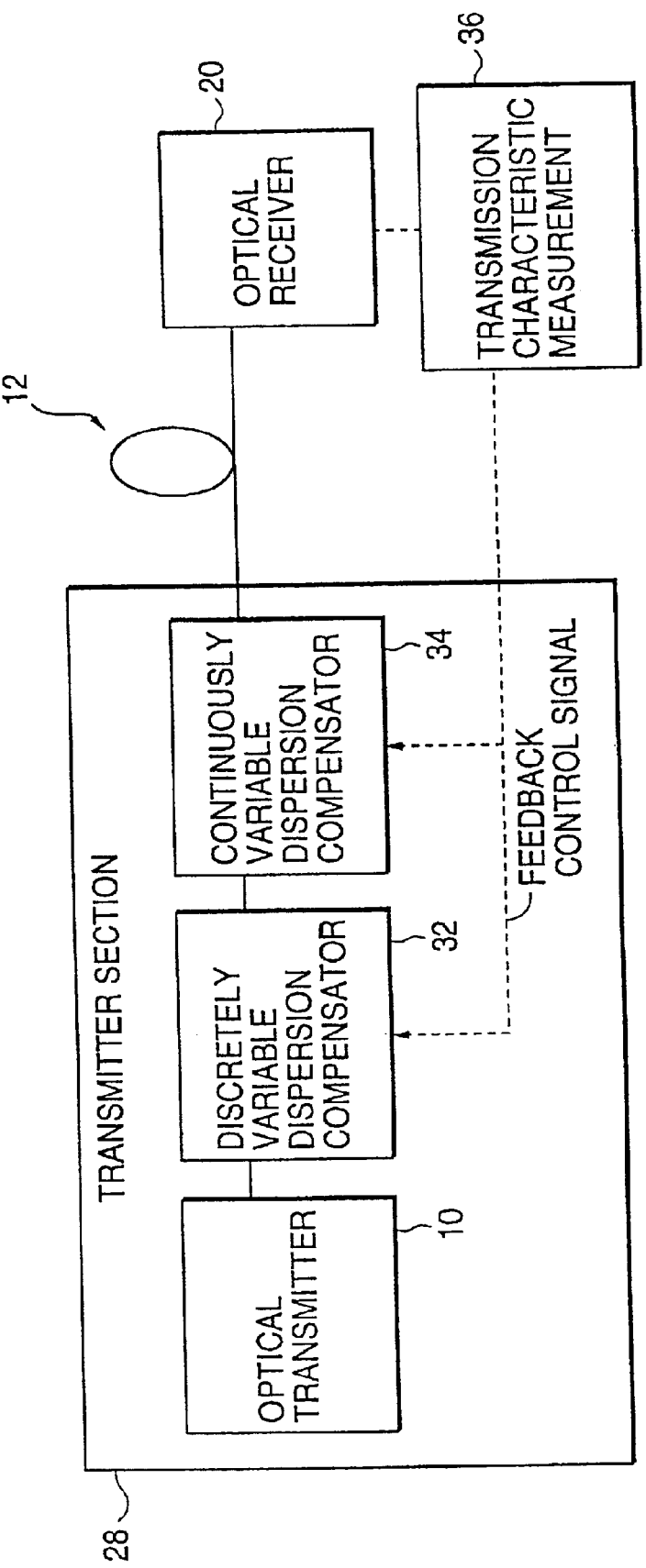
FIG. 25 is a diagram illustrating a modification of the optical transmission system of FIG. 21, according to an embodiment of the present invention.
Figure 26:
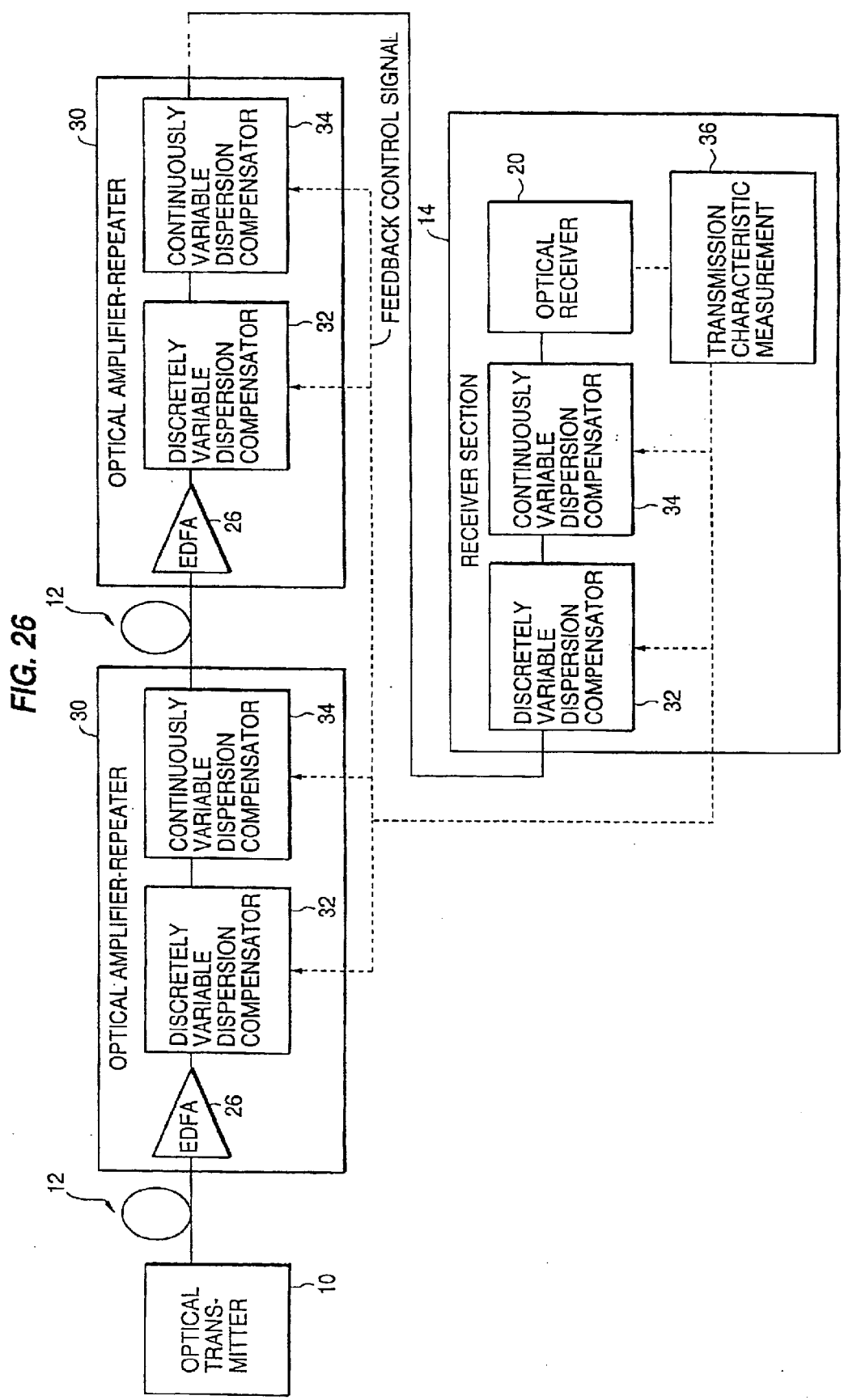
FIG. 26 is a diagram illustrating a modification of the optical transmission system of FIG. 21, according to an embodiment of the present invention.

More specifically, FIG. 21 is a diagram illustrating an optical transmission system, according to a further embodiment of the present invention. FIGS. 22–26 illustrate modifications of the optical transmission system of FIG. 21, according to an embodiment of the present invention.

Referring now to FIGS. 21–26, a transmission characteristic measuring section 36 is preferably provided at the receiving end. Then, for example, during system power up, transmission characteristic measuring section 36 measures a transmission characteristic, and the dispersion compensation values are set so as to optimize the transmission characteristics. At this time, it is also possible to sweep the dispersion compensation amount while feeding back a control signal to the variable dispersion compensator (continuously variable, discretely variable), as shown in the figures. The bit-error rate, Q value, signal parity bit check, transmission waveform, etc. can be used as the transmission characteristic measured here.

Figure 27:
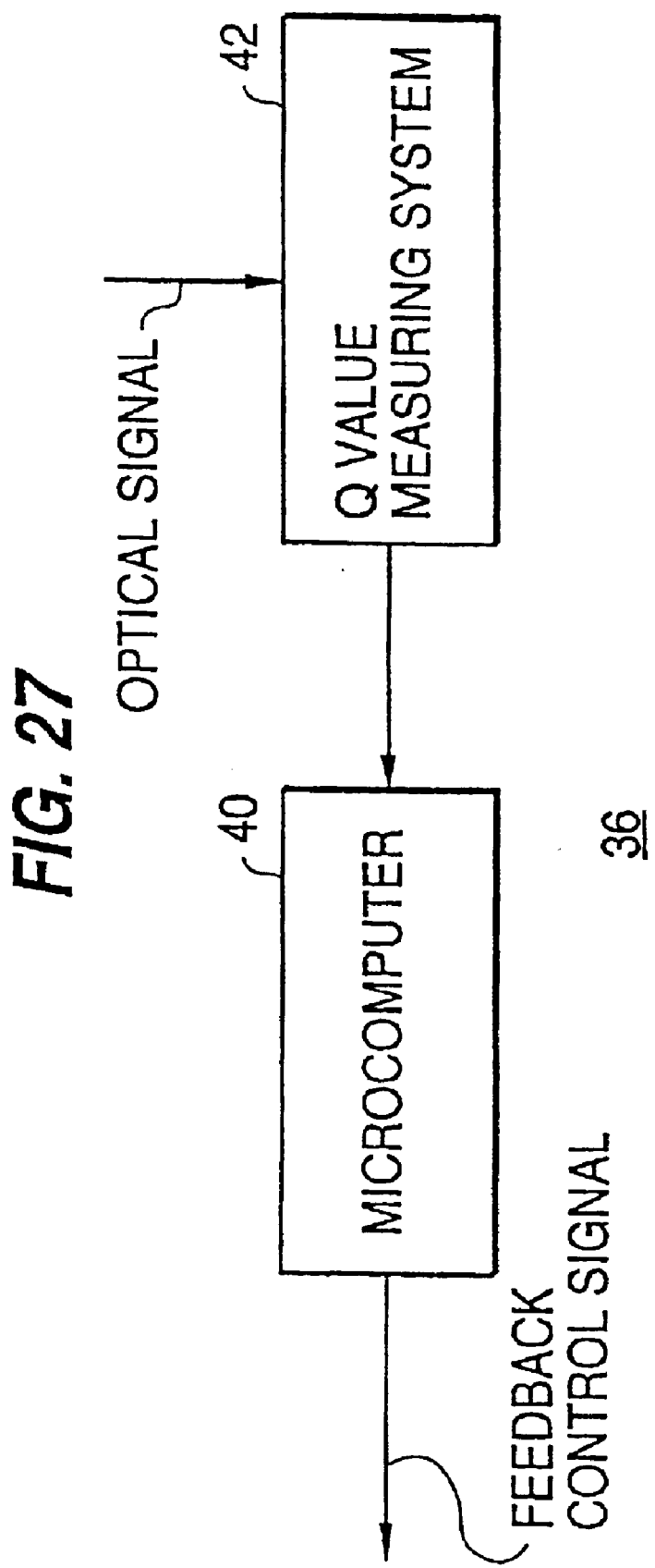
FIG. 27 is a diagram illustrating a detailed configuration of a transmission characteristic measuring section, according to an embodiment of the present invention.

FIG. 27 is a diagram illustrating an example of a detailed configuration of transmission characteristic measuring section 36 in which the Q value is measured and fed back as the transmission characteristic. Referring now to FIG. 27, a Q value measuring system 42 measures the Q value from an optical signal transmitted through the transmission line, and a microcomputer 40 uses the measured Q value to provide a feedback control signal.

Figure 28:
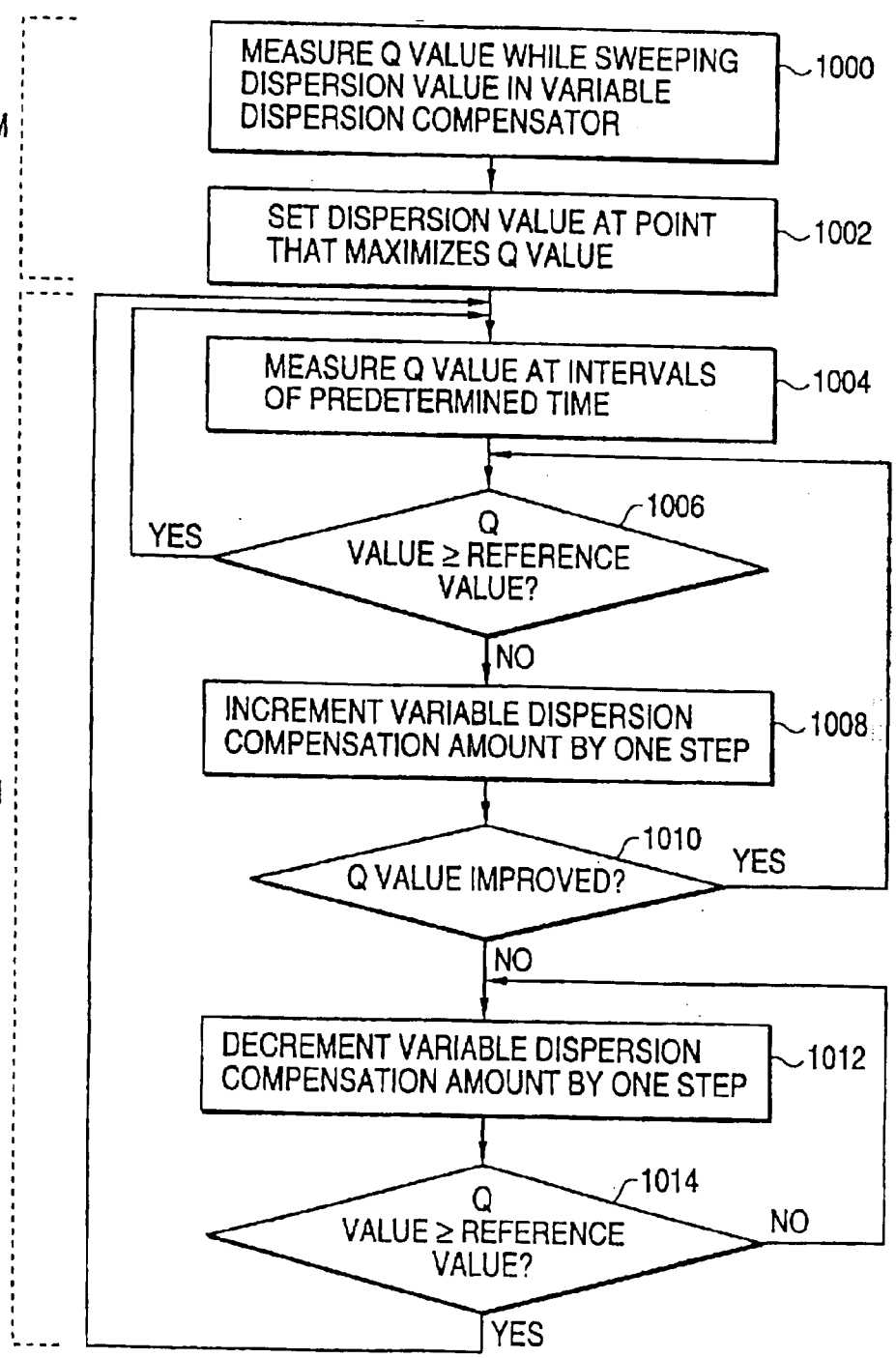
FIG. 28 is a flow chart illustrating the operation of a microcomputer in FIG. 27, according to an embodiment of the present invention.

FIG. 28 is a flow chart illustrating the operation of microcomputer 40 shown in FIG. 27, according to an embodiment of the present invention. In FIG. 28, the Q value is measured during system power up while sweeping the dispersion value in the variable dispersion compensator (step 1000), and the dispersion value of the variable dispersion compensator is set to a value that maximizes the Q value (step 1002). During system operation, the Q value is measured, for example, at intervals of one hour (step 1004), and if the measured value is less than reference value (step 1006), the dispersion value in the variable dispersion compensator is incremented by one step (step 1008). If the Q value is improved, the process returns to the decision-making operation in step 1006. If the Q value is not improved, the dispersion value is then decremented by one step (step 1012), and the step 1012 is repeated until the Q value becomes equal to or greater than the reference value.

Figure 29:
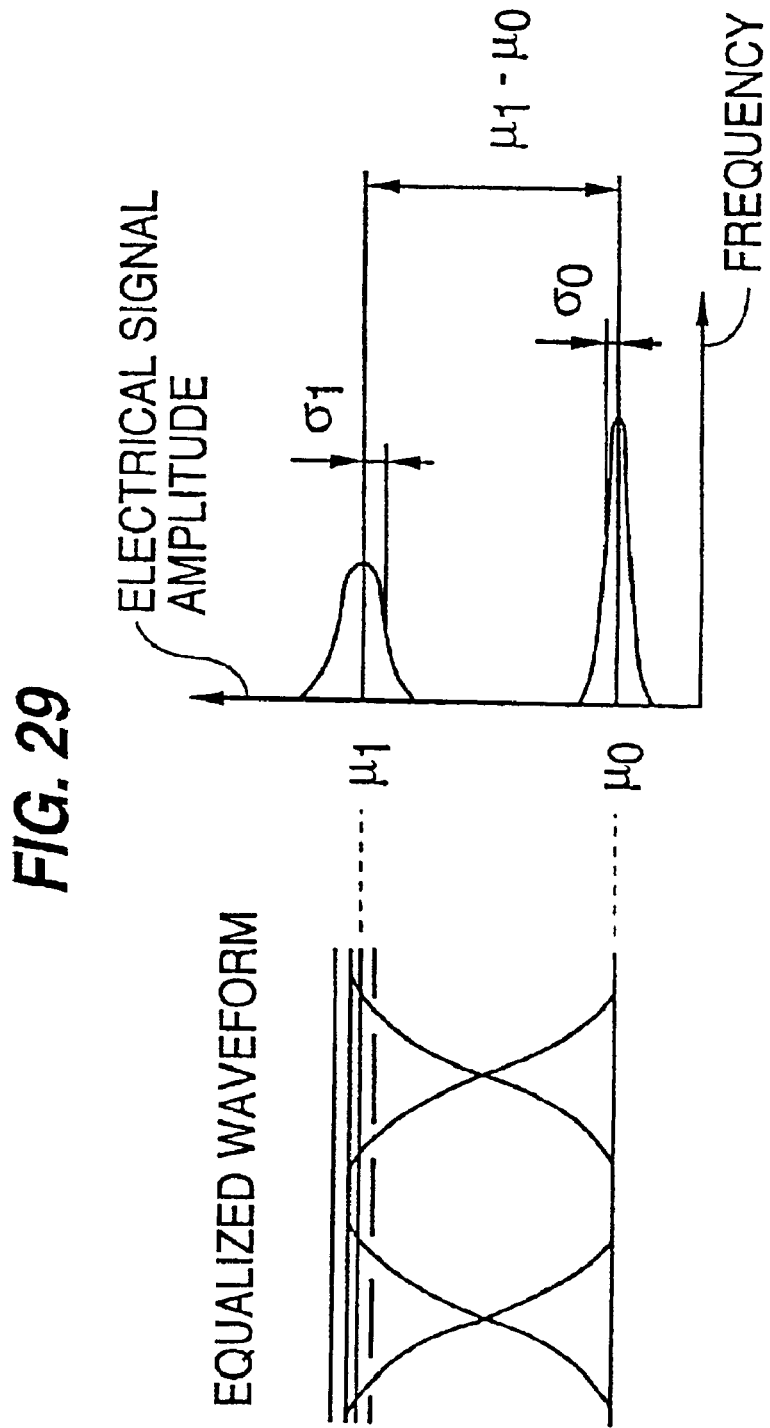
FIG. 29 is a diagram showing the definition of a Q value, according to an embodiment of the present invention.

FIG. 29 is a diagram showing the definition of the Q value measured by Q value measuring system 42, according to an embodiment of the present invention. That is $$Q = 20\ \log_{10}[(\mu_1-\mu_0)/(\sigma_1+\sigma_0)]$$

where $\mu_1$: average level during "emission"

$\mu_0$: average level during "no emission"

$\sigma_1$: standard deviation of level during "emission"

$\sigma_0$: standard deviation of level during "no emission"

The Q value is expressed using the signal level difference (signal amplitude) between emission and no emission as the numerator and the sum of the standard deviations of noise during emission and during no emission as the denominator. When a Gaussian distribution is assumed for the noise distribution, the bit-error rate given by the Q value defined in FIG. 29 agrees with the minimum value of the actually measured bit-error rate. Q value measuring system 42 is substantially identical in configuration to the optical receiver. That is, using a discrimination circuit having a reference voltage varying function, the discrimination level for an equalized waveform is varied up and down with respect to the optimum level to measure the bit-error rate, and by finding the intersection of the two straight lines obtained from the measurement, the minimum point of the bit-error rate is estimated, and the Q value can thus be obtained.

The chromatic dispersion value of the received light itself may be measured as the transmission characteristic, and the variable dispersion compensator may be controlled so that the dispersion is set to an optimum value. The measurement of the chromatic dispersion value can be achieved by simply using a commercially available chromatic dispersion measuring device, or by incorporating the equivalent function into the transmitting and/or receiving equipment. Alternatively, the intensity of a specific frequency component in the baseband region, especially the intensity of a clock signal component, may be detected from the received signal, and the amount of dispersion compensation may be controlled so that the intensity reaches a maximum or a minimum, or a prescribed value, by using the relationship between the chromatic dispersion value and the intensity of the clock signal component.

Furthermore, by controlling the amount of dispersion compensation while monitoring the transmission characteristic not only during system power up but also during system operation, control can be performed to accommodate the temperature dependence, temporal change, etc. of the chromatic dispersion value of the transmission line.

The locations of the dispersion compensators 16, 18, 32, and 34 are not limited to the examples shown in FIGS. 21 to 26, but various modifications such as those described previously are possible.

Several methods are possible for transmitting the feedback signal from the receiving end to each variable dispersion compensator. For example, a bidirectional communication method using a fiber transmission line or a low-speed electrical analog communication method can be used. Further, it is also possible to automatically set the amount of dispersion compensation to an optimum value by using a CPU or by centrally controlling the entire system. When there is a spare line having substantially the same dispersion condition and installation environment as the working line, a method can be employed in which the amount of dispersion compensation is first optimized using the spare line, and then, by referring to the result, the value is applied to the working line. With this method, the amount of dispersion compensation can be optimized without interrupting service.

According to the above embodiments of the present invention, transmission speed can be increased while using already installed fiber transmission lines without modifications, and different types of fiber (SMF, DSF), different repeater spacings, and the variation of the chromatic dispersion value along fiber length can also be accommodated. These together serve to reduce the overall cost of the system.

According to the above embodiments of the present invention, the chromatic dispersion of the optical transmission line is coarsely compensated for by using a fixed dispersion compensator or a discretely variable dispersion compensator according to the length of the transmission distance, and then the chromatic dispersion is finely compensated for by using a variable dispersion compensator or a continuously variable dispersion compensator. In this way, highly precise compensation can be made even when the required dispersion compensation amount is large, and large-capacity transmission is thus made possible.

In the above embodiments of the present invention, an optical transmission system includes two types of dispersion compensators (such as a fixed dispersion compensator in combination with a variable dispersion compensator, or a discretely variable dispersion compensator in combination with a continuously variable dispersion compensator). These different compensators can have many different positions in the optical transmission system. For example, one compensator can be in a transmitter section and the other compensator can be in a receiver section. Or, both compensators can be in the transmitter section, the receiver section or in a repeater.

Often, both compensators can be included in the same housing. For example, when both compensators are in the receiver section, transmitter section or repeater, they are typically enclosed inside the same housing. For example, in the above drawings, such a housing would typically be represented by the "box" illustrating a specific element. For example, in FIG. 1, the "box" representing receiver section 14 could indicate a housing of the receiver section which includes the various elements enclosed therein. Similarly, for example, in FIG. 6, the "box" representing transmitter section 28 could indicate a housing of the transmitter section which includes the various elements enclosed therein.

In addition, in many situations, both compensators are located in very close physical proximity, such as less than or equal to three meters. In some situations, the compensators can be located very close together so that there is no transmission line between the two compensators. This close situation can occur, for example, when both compensators are located in the transmitter section or the receiver section. When the compensators are located in close proximity, it is very easy to coordinate the combined compensation, and provide the appropriate amount of dispersion compensation fine-tuning.

In the above embodiments of the present invention, the "receiver section" can simply be referred to as a "receiver". Similarly, the "transmission section" can simply be referred to as a "transmitter".

Therefore, according to the above embodiments of the present invention, an apparatus compensates for dispersion in an optical transmission line. The apparatus includes a fixed dispersion compensator and a variable dispersion compensator. The fixed dispersion compensator has a fixed dispersion amount and coarsely compensates for the dispersion in the transmission line. The variable dispersion compensator has a variable dispersion amount and finely compensates for the dispersion in the transmission line.

The fixed and variable dispersion compensators can be located at many positions. For example, one may be in a transmitter and the other may be in a receiver. Both may be in the transmitter and/or the receiver. One may be in either the transmitter or the receiver, with the other in an optical repeater positioned along the transmission line.

There are many other possible configurations. For example, either a first fixed dispersion compensator or the variable dispersion compensator can be in the transmitter, with the other in the receiver. In this case, a second fixed dispersion compensator can be positioned in an optical repeater.

Further, either a first fixed dispersion compensator or a first variable dispersion compensator can be in the transmitter, with the other in the receiver. In this case, a second fixed dispersion compensator and a second variable dispersion compensator can be positioned in an optical repeater.

Moreover, a first fixed dispersion compensator can be in the transmitter while a second fixed dispersion compensator is in the receiver. In this case, a variable dispersion compensator can be at virtually any location in the optical transmission system.

In addition, both the fixed dispersion compensator and the variable dispersion compensator can be enclosed inside the same housing. Further, in many situations, the fixed dispersion compensator and the variable dispersion compensator will be located physically close together, such as within or equal to three meters. Moreover, in some situations, the fixed dispersion compensator and the variable dispersion compensator can be directly connected to each other so that no portion of the transmission line is between the fixed dispersion compensator and the variable dispersion compensator.

In addition, according to the above embodiments of the present invention, an apparatus includes a discretely variable dispersion compensator and a continuously variable dispersion compensator. The discretely variable dispersion compensator has a discontinuously variable dispersion amount and coarsely compensates for the dispersion in the transmission line. The continuously variable dispersion compensator has a continuously variable dispersion amount and finely compensates for dispersion in the transmission line.

The discretely and continuously variable dispersion compensators can be located at many positions. For example, one may be in a transmitter and the other may be in a receiver. Both may be in the transmitter and/or the receiver. One may be in either the transmitter or the receiver, with the other in an optical repeater positioned along the transmission line.

There are many other possible configurations. For example, either a first discretely variable dispersion compensator or the continuously variable dispersion compensator can be in the transmitter, with the other in the receiver. In this case, a second discretely variable dispersion compensator can be positioned in an optical repeater.

Further, either a first discretely variable dispersion compensator or a first continuously variable dispersion compensator can be in the transmitter, with the other in the receiver. In this case, a second discretely variable dispersion compensator and a second continuously variable dispersion compensator can be positioned in an optical repeater.

Moreover, a first discretely variable dispersion compensator can be in the transmitter while a second discretely variable dispersion compensator is in the receiver. In this case, a continuously variable dispersion compensator can be at virtually any location in the optical transmission system.

In addition, both the discretely and continuously variable dispersion compensators can be enclosed inside the same housing. Further, in many situations, the discretely and continuously variable dispersion compensators will be located physically close together, such as within or equal to three meters. Moreover, in some situations, the discretely and continuously variable dispersion compensators can be directly connected to each other so that no portion of the transmission line is between the fixed dispersion compensator and the variable dispersion compensator.

According to the above embodiments of the present invention, a compensator can be positioned at either the transmitting end or the receiving end of a transmission line. Generally, a transmission line can be considered as having two ends. One end is where a signal is provided to the transmission line to be transmitted through the transmission line, and the other end is where the signal is received from the transmission line.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a variable dispersion compensator providing variable dispersion compensation to an optical signal;
   a fixed dispersion compensator providing fixed dispersion compensation to the optical signal;
   an optical receiver receiving the optical signal having been provided with variable dispersion compensation by the variable dispersion compensator and fixed dispersion compensation by the fixed dispersion compensator;
   a transmission characteristic measurement unit measuring a transmission characteristic and controlling an amount of variable dispersion compensation provided by the variable dispersion compensator in accordance with the measured transmission characteristic; and
   a receiver section which includes the variable dispersion compensator, the fixed dispersion compensator and the optical receiver, wherein the variable dispersion compensation provided by the variable dispersion compensator is fine, compared to the fixed dispersion compensation provided by the fixed dispersion compensator.

2. An apparatus as in claim 1, wherein the receiver section includes the transmission characteristic measurement unit.

3. An apparatus comprising:
   variable dispersion means for providing variable dispersion compensation to an optical signal;
   fixed dispersion means for providing fixed dispersion compensation to the optical signal;
   an optical receiver receiving the optical signal having been provided with variable dispersion compensation by the variable dispersion means and fixed dispersion compensation by the fixed dispersion means;
   transmission characteristic measurement means for measuring a transmission characteristic and controlling an amount of variable dispersion compensation provided by the variable dispersion means in accordance with the measured transmission characteristic; and
   an enclosure enclosing the variable dispersion means, the fixed dispersion means and the optical receiver, wherein the variable dispersion compensation provided by the variable dispersion means is fine, compared to the fixed dispersion compensation provided by the fixed dispersion compensation means.

4. An apparatus comprising:
   an receiver section comprising
      a variable dispersion compensator providing variable dispersion compensation to an optical signal,
      a fixed dispersion compensator providing fixed dispersion compensation to the optical signal, and
      an optical receiver receiving the optical signal having been provided with variable dispersion compensation by the variable dispersion compensator and fixed dispersion compensation by the fixed dispersion compensator; and
   a transmission characteristic measurement unit measuring a transmission characteristic and controlling an amount of variable dispersion compensation provided by the variable dispersion compensator in accordance with the measured transmission characteristic, wherein the variable dispersion compensation provided by the variable dispersion compensator is fine, compared to the fixed dispersion compensation provided by the fixed dispersion compensator.

5. An apparatus comprising:
   means for providing variable dispersion compensation to an optical signal;
   means for providing fixed dispersion compensation to the optical signal;
   means for receiving the optical signal having been provided with variable dispersion compensation by the means for providing variable dispersion compensation and fixed dispersion compensation by the means for providing fixed dispersion compensation;
   means for measuring a transmission characteristic and for controlling an amount of variable dispersion compensation provided by the means for providing variable dispersion compensation in accordance with the measured transmission characteristic; and
   a receiver section which includes the means for providing variable dispersion compensation, the means for providing fixed dispersion compensation and the means for receiving, wherein the variable dispersion compensation is fine, compared to the fixed dispersion compensation.

6. An apparatus comprising:
   a receiver section comprising
      means for providing variable dispersion compensation to an optical signal,
      means for providing fixed dispersion compensation to the optical signal, and
      means for receiving the optical signal having been provided with variable dispersion compensation by the means for providing variable dispersion compensation and fixed dispersion compensation by the means for providing fixed dispersion compensation; and
   means for measuring a transmission characteristic and for controlling an amount of variable dispersion compensation provided by the means for providing variable dispersion compensation in accordance with the measured transmission characteristic, wherein the variable dispersion compensation is fine, compared to the fixed dispersion compensation.

7. An apparatus comprising:
   a transmitter transmitting an optical signal:
   a variable dispersion compensator providing variable dispersion compensation to the optical signal;
   a fixed dispersion compensator providing fixed dispersion compensation to the optical signal;
   an optical receiver receiving the optical signal having been provided with variable dispersion compensation by the variable dispersion compensator and fixed dispersion compensation by the fixed dispersion compensator;
   a transmission characteristic measurement unit measuring a transmission characteristic and controlling an amount of variable dispersion compensation provided by the variable dispersion compensator in accordance with the measured transmission characteristic; and
   a receiver section which includes the variable dispersion compensator, the fixed dispersion compensator and the optical receiver, wherein the variable dispersion compensation provided by the variable dispersion compensator is fine, compared to the fixed dispersion compensation provided by the fixed dispersion compensator.

8. An apparatus as in claim 7, wherein the receiver section includes the transmission characteristic measurement unit.

9. An apparatus comprising:
a transmitter transmitting an optical signal;
variable dispersion means for providing variable dispersion compensation to the optical signal;
fixed dispersion means for providing fixed dispersion compensation to the optical signal;
an optical receiver receiving the optical signal having been provided with variable dispersion compensation by the variable dispersion means and fixed dispersion compensation by the fixed dispersion means;
transmission characteristic measurement means for measuring a transmission characteristic and controlling an amount of variable dispersion compensation provided by the variable dispersion means in accordance with the measured transmission characteristic; and
an enclosure enclosing the variable dispersion means, the fixed dispersion means and the optical receiver, wherein the variable dispersion compensation provided by the variable dispersion means is fine, compared to the fixed dispersion compensation provided by the fixed dispersion means.

10. An apparatus comprising:
a transmitter transmitting an optical signal;
an receiver section comprising
a variable dispersion compensator providing variable dispersion compensation to the optical signal,
a fixed dispersion compensator providing fixed dispersion compensation to the optical signal, and
an optical receiver receiving the optical signal having been provided with variable dispersion compensation by the variable dispersion compensator and fixed dispersion compensation by the fixed dispersion compensator, and
a transmission characteristic measurement unit measuring a transmission characteristic and controlling an amount of variable dispersion compensation provided by the variable dispersion compensator in accordance with the measured transmission characteristic, wherein the variable dispersion compensation provided by the variable dispersion compensator is fine, compared to the fixed dispersion compensation provided by the fixed dispersion compensator.

11. An apparatus comprising:
a transmitter transmitting an optical signal;
means for providing variable dispersion compensation to the optical signal;
means for providing fixed dispersion compensation to the optical signal;
means for receiving the optical signal having been provided with variable dispersion compensation by the means for providing variable dispersion compensation and fixed dispersion compensation by the means for providing fixed dispersion compensation;
means for measuring a transmission characteristic and for controlling an amount of variable dispersion compensation provided by the means for providing variable dispersion compensation in accordance with the measured transmission characteristic; and
a receiver section which includes the means for providing variable dispersion compensation, the means for providing fixed dispersion compensation and the means for receiving, wherein the variable dispersion compensation is fine, compared to the fixed dispersion compensation.

12. An apparatus comprising:
a transmitter transmitting an optical signal;
a receiver section comprising
means for providing variable dispersion compensation to the optical signal,
means for providing fixed dispersion compensation to the optical signal, and
means for receiving the optical signal having been provided with variable dispersion compensation by the means for providing variable dispersion compensation and fixed dispersion compensation by the means for providing fixed dispersion compensation; and
means for measuring a transmission characteristic and controlling an amount of variable dispersion compensation provided by the means for providing variable dispersion compensation in accordance with the measured transmission characteristic, wherein the variable dispersion compensation is fine, compared to the fixed dispersion compensation.

* * * * *

UNITED STATES PATENT AND TRADEMARK OFFICE
CERTIFICATE OF CORRECTION

PATENT NO.   : 6,909,851 B2
DATED        : June 21, 2005
INVENTOR(S)  : George Ishikawa It is certified that error appears in the above-identified patent and that said Letters Patent is hereby corrected as shown below:

Column 13,
Line 52, change "an" to -- a --.

Column 14,
Line 46, change "signal:" to -- signal; --.

Column 15,
Line 27, change "an" to -- a --.
Line 37, change "compensator," to -- compensator; --.

Signed and Sealed this

Fourteenth Day of March, 2006

JON W. DUDAS
*Director of the United States Patent and Trademark Office*